(12) United States Patent
Lauzier et al.

(10) Patent No.: US 11,573,140 B2
(45) Date of Patent: Feb. 7, 2023

(54) FORCE/TORQUE SENSOR, APPARATUS AND METHOD FOR ROBOT TEACHING AND OPERATION

(71) Applicant: ROBOTIQ INC., Saint-Nicolas (CA)

(72) Inventors: Nicolas Lauzier, Quebec (CA); Simon Lefrançois, Cochrane (CA); David Castonguay, St-Lambert-de-Lauzon (CA); Louis-Alexis Allen Demers, Levis (CA); Jean-François Duval, Saint-Pascal (CA); Yan Drolet Mihelic, Quebec (CA); Pierre Olivier Proulx, Quebec (CA); Rachid Bekhti, Montreal (CA); Philippe Cardou, Quebec (CA); Vincent Duchaine, Mont-Saint-Hilaire (CA); Samuel Bouchard, Sainte-Foy (CA); Jean-Philippe Jobin, Lévis (CA)

( * ) Notice: Subject to any disclaimer, the term of this patent is extended or adjusted under 35 U.S.C. 154(b) by 245 days.

(21) Appl. No.: 17/093,965

(22) Filed: Nov. 10, 2020

(65) Prior Publication Data

US 2021/0055170 A1 Feb. 25, 2021

Related U.S. Application Data

(60) Continuation of application No. 16/291,612, filed on Mar. 4, 2019, now Pat. No. 10,866,150, which is a (Continued)

(51) Int. Cl.
*G01L 5/00* (2006.01)
*G01L 5/169* (2020.01)
(Continued)

(52) U.S. Cl.
CPC ............. *G01L 5/169* (2020.01); *B25J 9/0081* (2013.01); *B25J 9/163* (2013.01); *B25J 13/085* (2013.01);
(Continued)

(58) Field of Classification Search
CPC ............. G01L 5/169; G01L 1/14; G01L 5/16; G01L 5/226; G01L 25/00; B25J 9/0081;
(Continued)

(56) References Cited

U.S. PATENT DOCUMENTS

| 4,448,083 A | 5/1984 | Hayashi |
| 4,589,810 A | 5/1986 | Heindl et al. |

(Continued)

FOREIGN PATENT DOCUMENTS

| JP | H042460 A | 1/1992 |
| JP | H1148178 A | 2/1999 |

OTHER PUBLICATIONS

International application No. PCT/CA2014/050033 International Preliminary Report on Patentability Chapter II dated Jun. 9, 2015.

(Continued)

*Primary Examiner* — Max H Noori

(57) ABSTRACT

This invention relates to force/torque sensor and more particularly to multi-axis force/torque sensor and the methods of use for directly teaching a task to a mechatronic manipulator. The force/torque sensor has a casing, an outer frame forming part of or connected to the casing, an inner frame forming part of or connected to the casing, a compliant member connecting the outer frame to the inner frame, and one or more measurement elements mounted in the casing for measuring compliance of the compliant member when a force or torque is applied between the outer frame and the inner frame.

12 Claims, 19 Drawing Sheets

Related U.S. Application Data continuation of application No. 15/600,105, filed on May 19, 2017, now Pat. No. 10,260,970, which is a division of application No. 14/802,337, filed on Jul. 17, 2015, now Pat. No. 9,696,221, which is a continuation-in-part of application No. PCT/CA2014/050033, filed on Jan. 17, 2014.

(60) Provisional application No. 61/754,507, filed on Jan. 18, 2013.

(51) Int. Cl.

| | | |
|---|---|---|
| *G01L 1/14* | (2006.01) | |
| *B25J 9/16* | (2006.01) | |
| *B25J 9/00* | (2006.01) | |
| *B25J 13/08* | (2006.01) | |
| *G01L 25/00* | (2006.01) | |
| *G01L 5/22* | (2006.01) | |
| *G05B 19/423* | (2006.01) | |
| *G01L 5/16* | (2020.01) | |

(52) U.S. Cl.
CPC .................. *G01L 1/14* (2013.01); *G01L 5/16* (2013.01); *G01L 5/226* (2013.01); *G01L 25/00* (2013.01); *G05B 19/423* (2013.01); *G05B 2219/39529* (2013.01); *Y10S 901/02* (2013.01); *Y10S 901/30* (2013.01)

(58) Field of Classification Search
CPC ....... B25J 9/163; B25J 13/085; G05B 19/423; G05B 2219/39529; Y10S 901/02; Y10S 901/30
See application file for complete search history.

(56) References Cited

U.S. PATENT DOCUMENTS

| | | | |
|---|---|---|---|
| 4,763,531 A | 8/1988 | Dietrich et al. | |
| 5,495,410 A | 2/1996 | Graf | |
| 5,668,453 A * | 9/1997 | Muto | B25J 9/1679 |
| | | | 700/262 |
| 5,760,312 A | 6/1998 | MacKay et al. | |
| 5,880,956 A | 3/1999 | Graf | |
| 5,889,214 A | 3/1999 | Kang et al. | |
| 6,915,709 B2 | 7/2005 | Okada | |
| 6,928,336 B2 | 8/2005 | Peshkin et al. | |
| 7,120,508 B2 | 10/2006 | Peshkin et al. | |
| 7,220,958 B2 | 5/2007 | Kitamura et al. | |
| 7,757,571 B2 | 7/2010 | Hirabayashi et al. | |
| 8,627,727 B2 | 1/2014 | Eriksen et al. | |
| 8,965,576 B2 | 2/2015 | Chen et al. | |
| 8,984,962 B2 | 3/2015 | Christmann | |
| 2002/0158599 A1 | 10/2002 | Fujita et al. | |
| 2005/0092096 A1 | 5/2005 | Okada | |
| 2005/0113977 A1 | 5/2005 | Nihei et al. | |
| 2005/0222714 A1 | 10/2005 | Nihei et al. | |
| 2005/0230557 A1 | 10/2005 | Aghili | |
| 2006/0178559 A1 | 8/2006 | Kumar et al. | |
| 2009/0007668 A1 | 1/2009 | Beyeler et al. | |
| 2009/0248038 A1* | 10/2009 | Blumenkranz | A61B 34/30 |
| | | | 606/130 |
| 2009/0301226 A1 | 12/2009 | Hirabayashi et al. | |
| 2010/0109360 A1 | 5/2010 | Meisho | |
| 2010/0180711 A1 | 7/2010 | Kilibarda et al. | |
| 2012/0012701 A1 | 1/2012 | Eriksen et al. | |
| 2012/0158181 A1* | 6/2012 | Seo | B25J 9/16 |
| | | | 901/16 |
| 2012/0215358 A1 | 8/2012 | Gettings et al. | |
| 2013/0345872 A1 | 12/2013 | Brooks et al. | |
| 2014/0343728 A1* | 11/2014 | Jun | B63G 8/14 |
| | | | 901/1 |
| 2014/0371906 A1 | 12/2014 | Barajas et al. | |
| 2015/0081098 A1* | 3/2015 | Kogan | B25J 9/1656 |
| | | | 901/46 |
| 2015/0375392 A1* | 12/2015 | Inazumi | B25J 9/1694 |
| | | | 901/46 |
| 2018/0370046 A1* | 12/2018 | Hance | G06Q 10/0875 |
| 2022/0233250 A1* | 7/2022 | Bette | A61B 5/053 |
| 2022/0266446 A1* | 8/2022 | Cristache | B25J 9/1697 |
| 2022/0266451 A1* | 8/2022 | Cristache | G05B 19/4155 |

OTHER PUBLICATIONS

International application No. PCT/CA2014/050033 International Search Report dated May 5, 2014.
International application No. PCT/CA2014/050033 Search Strategy dated May 5, 2014.
International application No. PCT/CA2014/050033 Written Opinion of the International Searching Authority dated May 5, 2014.

* cited by examiner

103a

103b

103c

103d

103e

103f

103g

103h

103i

103j

103k

103l

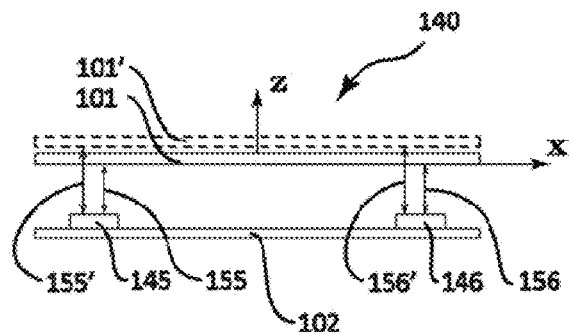 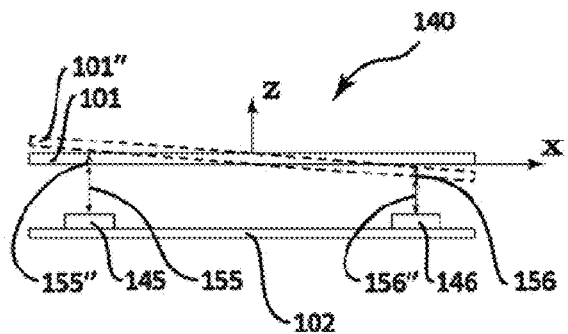
Fig. 6a    Fig. 6b
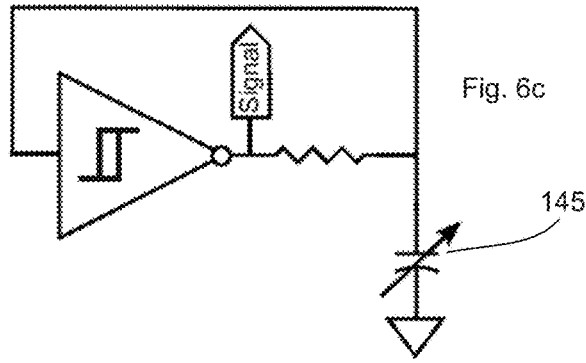
Fig. 6c
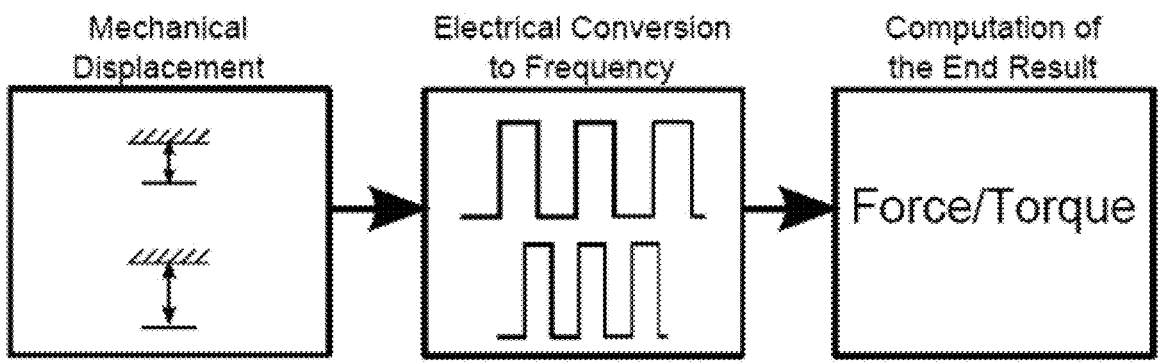
Fig. 6d
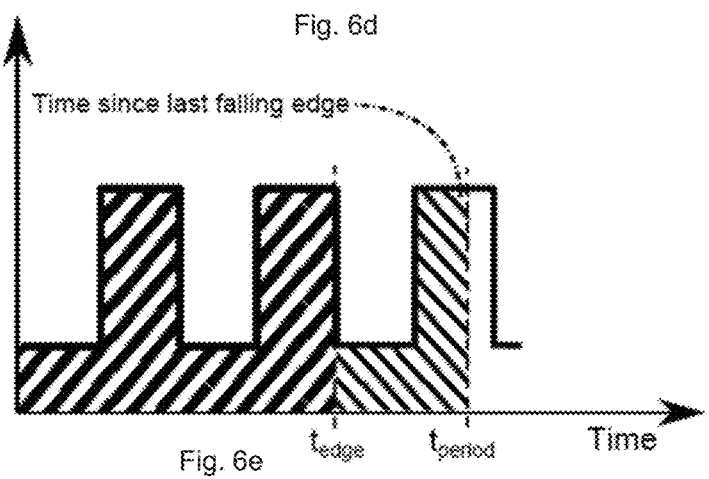
Fig. 6e

| Forces/torques | Measure elements | | | | | | | |
|---|---|---|---|---|---|---|---|---|
| | 141 | 142 | 143 | 144 | 145 | 146 | 147 | 148 |
| Fx | | | | | | | + | + |
| Fy | | | | | + | + | | |
| Fz | + | + | + | + | | | | |
| Tx | | | + | − | | | | |
| Ty | − | + | | | | | | |
| Tz | | | | | + | − | − | + |

```
Index,   ParamName , ParamType, ValueMin, ValueMax
1      , GRIPPER=  , Integer  , 0       , 10
2      , SPEED=    , Real     , 0       , 100
...
```

1900

FORCE/TORQUE SENSOR, APPARATUS AND METHOD FOR ROBOT TEACHING AND OPERATION

CROSS-REFERENCE TO RELATED APPLICATIONS

This application is a continuation of U.S. patent application Ser. No. 16/291,612 filed Mar. 4, 2019, now allowed, which, in turn, is a continuation of U.S. patent application Ser. No. 15/600,105 filed May 19, 2017, now U.S. Pat. No. 10,260,970 issued Apr. 16, 2019, which, in turn, which is a divisional of U.S. patent application Ser. No. 14/802,337 filed Jul. 17, 2015, now U.S. Pat. No. 9,696,221 issued Jul. 4, 2017, which, in turn, that is a continuation-in-part of International Application No. PCT/CA2014/050033 filed Jan. 17, 2014 designating the United States, that claims priority of U.S. provisional patent application 61/754,507 filed Jan. 18, 2013, the contents of which are hereby incorporated by reference.

TECHNICAL FIELD

The present relates to the field of force/torque sensors and intuitive programming used in robotics and other applications. More specifically, it relates to teaching or training a mechatronic manipulator by human gesture using multi-axis capacitive force/torque sensors combined with specific control algorithms to allow a human operator to precisely move the manipulator end-effector at configurations to register. These sensors are also referred to as force/torque transducers and intuitive programming is also referred to as human/robot collaboration or robot teaching or training.

BACKGROUND

This invention relates to force/torque sensor and more particularly to multi-axis force/torque sensor and the methods of use for directly teaching a task to a mechatronic manipulator.

A mechatronic manipulator is a mechanical device controlled electronically to move or orient an end-effector in space. The term manipulator in this document will refer to mechatronic manipulator having one or more degree-of-freedom (DOF). One category of mechatronic manipulator is a robot manipulator as defined by International Standard ISO 8373 being an "automatically controlled, reprogrammable multipurpose manipulator programmable in three or more axes".

Manipulators can be used to execute various processes such as arc welding, spot welding, painting, pick and place, assembly, dispensing, polishing or deburring, just to name a few. Each process usually make use of specific type of end-of-arm-tool (EOAT) installed at the robot end-of-arm, also called the robot wrist or face-plate.

Programming a robot typically consists in the three following aspects.
1. Recording various points (positions and/or orientations of the EOAT in space)
2. Adding process parameters: Where the process should start and stop, how the EOAT should be controlled in the sequence, etc.
3. Logic programming, detailing in the program what the robot should do in different circumstances. This logic programming can use information that is internal to the robot and its controller as well as sensor or information from external device(s).

The most widely used robot programming methods will fall into one of the following categories.
1. Using a teach pendant.
    A teach pendant is a terminal linked to the robot controller. It has a screen as well as several buttons to display and input information. Using the teach pendant buttons, the user jogs the robot to different positions to be recorded, adding process information manually or using pre-defined parameters database. Logic is also added using the robot programming interface on the teach pendant. For very complex tasks, code can be written in the robot specific language or on a computer to later be imported in the teach pendant.
2. Self-programming from sensor data.
    In this case, the robot will be pre-programmed by experts and the software will be able to make use of sensor data to generate automatically robot path (position sequence), process parameters and logic for a given task.
3. Off-line programming.
    In this case, the robot and its surroundings are simulated in a virtual environment. Starting from 3D drawings, a software will generate automatically or with little user aid the robot path (position sequence), process parameters and logic. The program is then transferred from the simulation environment to the robot.

Current robot programming methods present various challenges to the robot users, mainly because they require a good knowledge of robot kinematics, robot programming language and software. Processes are well known by people in the factories within different industries, the end-users. On the other hand, robots are just a tool for production and how to use them is not necessarily well known by the end-users. Programming robot thus involves a supplemental skill-set that needs to be learned and is also very time consuming, whatever programming method is involved. Using a teach pendant is the simplest but can be very time consuming. Still, the user needs to learn how to program robot on top of knowing the process. Self-programming from sensor data is fast during operations, but implies very complex programming up-front and can only be done initially by advanced robot users. Off-line programming is very efficient at generating complex paths from 3D part drawings and robot models. The differences between the simulated world and the real world need calibration and touch-ups after the generated program has been imported. The user in this case does not only have to learn how to program a robot but also need to learn the off-line programming software, which also implies knowing complex robotic notions.

To cope with the current programming challenges, new robots have been brought to market:
  Universal Robots (http://www.universal-robots.com/)
  Rethink Robotics Baxter robot (http://www.rethinkrobotics.com/)
  Kuka Light Weight Robots (http://www.kuka-robotics.com/en/products/addons/lwr/)
  ABB Frida
  Industrial robots:
    Assist device U.S. Pat. No. 7,120,508
  These robots have been specifically designed with the appropriate sensing, mechanical properties and software to allow teaching a task by demonstration. These robots are inherently safe to physically interact with humans during programming. This enables new ways of programming that is closer to teaching in the sense that no code is typed by the user and no position jogging using the teach pendant buttons are used, mainly motion is shown directly to the robot. The manipulator is directly led in space by the user that holds it directly to record the path. This approach simplifies the user learning. How these new robots are built to be inherently safe has the drawback of making them unsuitable for several processes requiring higher stiffness, repeatability, precision, payload, etc.

The current invention aims at reducing programming time and complexity of programming robots and other manipulators of any types, not only the new robots with inherently safe programming human-robot interaction. To this end, a force-torque sensor is installed to an existing robot. Combined with a specific software, this device can interpret the user's intent at moving a robot by holding it. Points and/or paths can then be recorded easily and quickly. Process and logic are also programmed using a simplified user interface on the sensor or elsewhere on the system. To make the solution viable, the sensor need to be cost-effective, robust, present no drift, output a clean signal at a high frequency rate and easy to install in conjunction with the different EOATs and on the different manipulators.

Many multi-axis force sensors have been proposed in the last 30 years. A first attempt to build a multi-axis forces and torques sensor is the "Device for measuring components of force and moment in plural directions" disclosed in U.S. Pat. No. 4,448,083 (publication date: 15 May 1984). In the latter they proposed to measure forces and moments along 3 orthogonal axis using a rigid structure on which is fixed strain gauges to measure local distortion. A variation to this method is the invention disclosed in U.S. Pat. No. 4,763,531 (publication date: 16 Aug. 1988) and named "Force-torque sensor". This sensor, made for measuring 6 forces and torques component in the cartesian space, is formed with two identically designed, integral spoke wheels. Each of these wheels consist in a rigid cylindrical outer ring and a rigid center hub connected between each other by at least three spokes disposed in a plane. They used a total of 20 strain gauges mounted on theses wheels to provide the 6 components of the force/moment. They claimed that this invention has the advantage to be mounted with exact positioning at very low manufacturing cost. However, while it is an improvement over the first presented approach, the amount of single sensing element required is still very important. More recently, Kang, Dae Im et al. presented the "6-component load cell" in U.S. Pat. No. 5,889,214 (publication date: 30 Mar. 1999) in which the deformable structure consists of a cross beam having horizontal and vertical parts crossing at right angles. The force measurement is made via many strain gauges attached to the bottom and side surfaces of this cross beam. The precision of this sensor is very high with a maximum interference error 2% in the measuring of force and moment components.

All the above mentioned approaches toward building multiple axis force and moment sensors based their measurements on strain gauges. Although this has the advantage of leading to a very compact and very stiff multi-axis force sensor, this sensing approach also has the drawback of being very sensitive to noise. This is a major inconvenient particularly for use in robotics since most industrial robots generate a lot of electromagnetic noise from the high frequency digital signals used to control their motors. Beside this undesirable noisy characteristic, the strain gauge approach also suffer from the problem of drift of their signal over time. While noise can be filtered, drift is very hard to compensate and in a situation where robot directly react to the level of measured force, drift of the zero force point represented an issue for safety consideration.

In reaction to these drawbacks Hirose has proposed a decade ago to use alternative way to measure forces based on optical sensors as an indication of the displacement of a given compliant structure. This optic based force sensor presented a good immunity to noise, low drift over time and are relatively cheap. However, it is not very accurate for measurement in the nano or low micro scale. Therefore, for a given force measurement range, they must be coupled with a structure of an higher compliance than with strain gauge, a characteristic that can make the resulting sensor less appropriate for some application that require stiffness and precision. An example of a multi axis force and moment sensor based on this approach is the "optical displacement sensor and external force detecting device" disclosed in U.S. Pat. No. 7,220,958 (publication date: 22 May 2007), used three light beams, each projected on a dual photoreceptor. The used of the photodiode technology for force measurement appears to be a very promising avenue, but at this moment still suffer from the short life of photodiode and more, from the constant decrease of its emitting power over its effective life and from the higher structural compliance required in the sensor One way to circumvent the noise sensitivity of strain gauge based multi-axis force sensor while keeping the sensitivity to very small displacement in the structure is to use the well known relation between the distance and overlap area of two conductive plates and the resulting capacitance measurement.

The proposed invention uses a plurality of sensitive elements for which a conductive plate is positioned on a fixed frame and another one is positioned on a moving frame. The two frames are linked by a compliant element such that the efforts applied on the moving frame will modify the distance between each pair of conductive plates. The positioning of the sensitive elements is completely dissociated from the compliant element. This method has several advantages compared to the existing force/torque sensors (Wacoh [2004, 2006, 2004][U.S. Pat. Nos. 6,915, 709 B2, 6,915,709, 6,915,709], Beyeler [US 2009/0007668], Honda [U.S. Pat. No. 7,757,571]). For instance, the positioning of the sensing elements and the design of the compliant element can be optimized separately. As such, the sensing elements can, for example, be placed in a single plane or in an architecture which will maximize the sensitivity, minimize the interrelation between the sensing of two different elements and simplify the calibration methods. Also, because the compliant element is independent from the sensing elements and thus not covered by it, its shape and material are not limited and therefore the relation between the applied forces/torques and the resulting displacements can be further optimized. Finally, because the sensing elements are independent from the compliant element, they can be pre-assembled on a fixture such as a printed circuit board and later be assembled as a whole. This results in the simplification of the sensor fabrication and assembly and the reduction of its cost.

SUMMARY

This invention relates to force/torque sensor and more particularly to multi-axis force/torque sensor and the methods of use for directly teaching a task to a mechatronic manipulator.

BRIEF DESCRIPTION OF THE DRAWINGS

The invention will be better understood by way of the following detailed description of embodiments of the invention with reference to the appended drawings, in which:

FIG. 6a is a schematic front view representation of the force/torque sensor showing the displacement of the casings one to each other when a force is applied to it, according to one embodiment presented in FIG. 5;

FIG. 6b is a schematic front view representation of the force/torque sensor showing the displacement of the casings one to each other when a torque is applied to it, according to one embodiment presented in FIG. 5;

FIG. 6c is a circuit diagram of an oscillator producing a pulse signal whose frequency depends on the capacitance of the measure elements;

FIG. 6d is a schematic block diagram illustrating the conversion of mechanical displacement into a variable frequency signal and subsequently into a force/torque computation result;

FIG. 6e is a signal diagram illustrating discriminating a pulse count according the embodiment of FIG. 6d;

DETAILED DESCRIPTION

Part 1: Force/Torque Sensor

Figure 1:
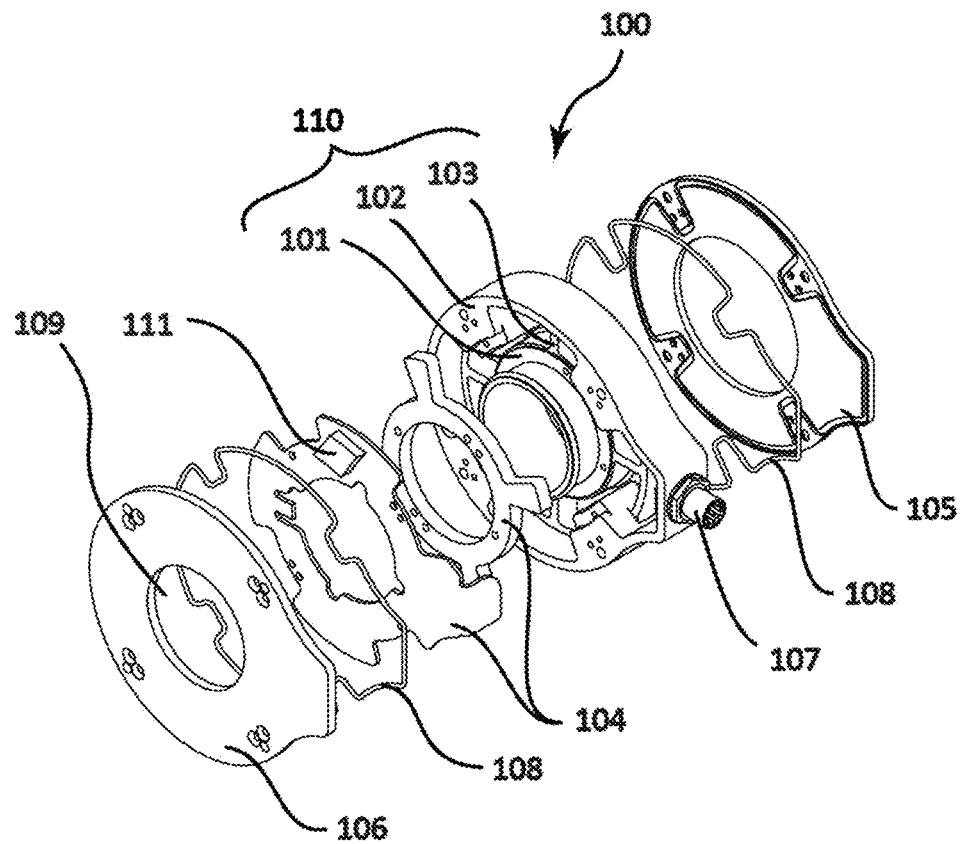
FIG. 1 is an exploded perspective view representation of the force/torque sensor where the casing has a disc-shape, according to one embodiment.

According to one part of this invention, there is presented in FIG. 1 a force/torque sensor 100. The force/torque sensor 100 is composed of a casing 110, lids 105 and 106, measure elements optionally integrated into printed circuit board(s) 104, processor 111, optionally mechanical devices, such as O-rings 105, to seal the force/torque sensor 100 against liquids and dust and optionally a connector 107 to communicate the information from the force/torque sensor 100 to another device.

A skilled person will understand that such force/torque sensor 100 could be designed in such a way to measure force and/or torques in one or more directions. While some applications require to measure the forces and torques in all directions (3 forces and 3 torques), lots of applications require only few directions. For example, cartesian manipulators could need a sensor 100 with 3 forces while SCARA manipulators could only need a sensor 100 with 3 forces and 1 torque.

A skilled person will understand that the connector 107 could be any means that would allow the force torque/sensor 100 to transfer information to another device. It is understood that it could also be wireless.

The processor 111 could be any type of processor that is able to acquire the information from the measure elements and do the required computations to interpret those measures into forces/torques. In the application of robot teaching, the processor will interpret the force/torque into user intent and generate commands to the robot. A skilled person will understand that this processor could be integrated into the force/torque sensor 100 itself (as shown in FIG. 1) or be separated from it. This processor 111 could also be used to allow for additional features to the forces sensors. Such filtering functionally examples are herein presented. A functionality that could be added would be to block or ignore certain force/torques in specific directions or when the force/torque is over or below a certain amplitude. In this circumstance the force/torque sensor 100 would return zero force/torque in the direction that have been blocked. This kind of functionality could be very useful in applications where forces/torques in specific directions are to be ignored. Such applications are robotic finishing (i.e. polishing, deburring or grinding), part insertion, contact detection, etc. A second functionality that could be done directly with the processor 111 is the ability to change the outputs of the force/torque sensor 100. In standard applications, forces and torques are the most useful information to have from the force/torque sensor 100 but other options are possible. In some applications, such as robotic teaching for tasks such as pick and place, painting or welding, the speed and the direction at which the robot has to move is more relevant. For such applications, the sensor could directly output the desired velocity (translational and rotational) in its coordinate frame, which is generally the same coordinate frame as the tool. Optionally, the sensor could output the desired velocity for each of the robot axis if the kinematics of the robot is known. In both cases, the robot would be programmed to move according to the velocity input from the sensor. Another sensor output possibility could be the identification of an object according to its mass and center of mass location. As an example, a robot programmed to pick similar objects with slight mechanical differences could distinguishes the object types using the sensor which was configured to recognize each type.

Further presented in FIG. 1, optionally, the sensor could have one or several holes 109 to be able to run objects through it, such as cables or air tubes. Alternatively, the connector 107 could be in the inside of the ring.

Figure 2A:
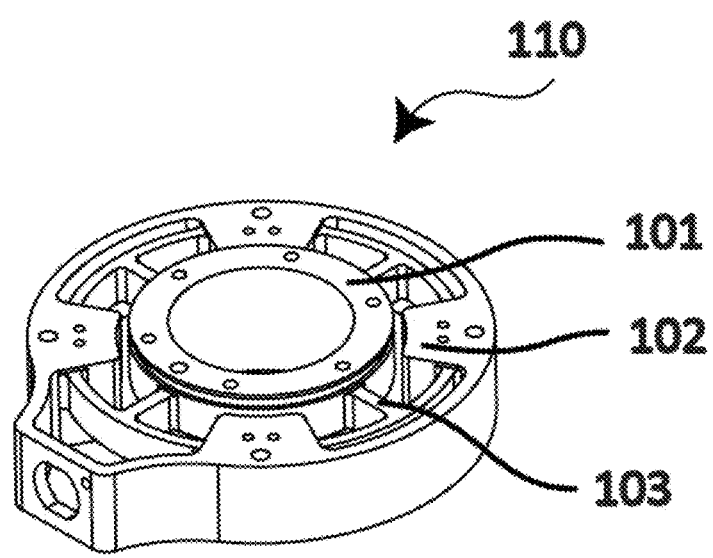
FIG. 2a is a perspective view representation of the force/torque sensor where the casing has a disc-shape, according to one embodiment.

Presented in FIG. 2a are front and isometric views of the casing 110 of the force/torque sensor 100. This casing 110 is composed of an external frame 102; also referred as the fixed frame, an internal frame 101; also referred as the moving frame and a compliant mechanism 103 linking the two frames 101 and 102. The compliant mechanism 103 allow the moving frame 101 to be able to move in one or more directions when a force/torque is applied to it and when the external frame is fixed. The magnitude of the displacement is related to the force/torque applied to the moving frame 101.

A skilled person will understand that the casing 110 could be manufactured using a single part or an assembly of many. It is also understood that the frames 101 and 102, and the compliant mechanism 103 could be made of different materials and could be of any shapes.

The measure elements 104 of FIG. 1 are independent to the compliant mechanism 103 of the force torque sensor 100. The measure elements 104 measure the displacement of the frames 101 and 102 one to each other at different places and in different orientations, no matter how the link is done between the frames 101 and 102. Hence, the measure elements 104 could be any type of sensor that will measure the displacement, such as (and not limiting to) capacitive sensors, Hall effect sensors, ultrasonic sensors, optical sensors, etc. The optical sensors could be the video cameras used in mobile phones or simply DEL sensors. The advantage of such optical sensors is that they are cheap and easy to integrate. The Hall effect sensors could be simply proximity sensors; many such IC chips are available on the market. To be able to measure several degree-of-freedom (DOF) of the force/torque sensor 101 at the same time, a single element that is able to measure several axis could be used, as well as a plurality of one-axis or multi-axis measure elements 104 in complementarity.

To increase the precision of the force/torque measurement, extra measure elements 104 (more than the number of DOFs of the force/torque sensor 100) could be used.

To compensate environmental variations (such as temperature fluctuation, atmospheric pressure, humidity, etc.), calibration sensor could be added to the force/torque sensor 101. Such calibration sensor would not be affected by frames 101 and 102 relative motions but only by environmental fluctuation. Hence, under environmental variations, it would be possible to calibrate the other sensor elements 104 using the measure of the calibration sensors. Temperature, pressure or humidity sensors could be added to the force/torque sensor to ease this environmental calibration.

To compensate many environmental variations at once, the calibration sensor could be the measure elements themselves if they are redundant (more measure elements than strictly required for the number of measured degrees of freedom) and positioned such that there are a combination of readings which cannot be obtained by applying efforts on the sensor. When a reading is measured for which no displacement of the mobile frame can correspond, a correction factor can be applied on all measuring elements. The correction factor is chosen such that the correct readings are coherent with a motion of the mobile frame of the sensor. A skilled person will understand that a subset of the measure elements can be used to obtain a correction factor that can be applied to all the measure elements.

A skilled person will understand that stand-alone sensors could be added to the force/torque sensor to increase its sensing capacity. Such sensors could be accelerometers, pressure or temperature sensors.

Figure 2B:
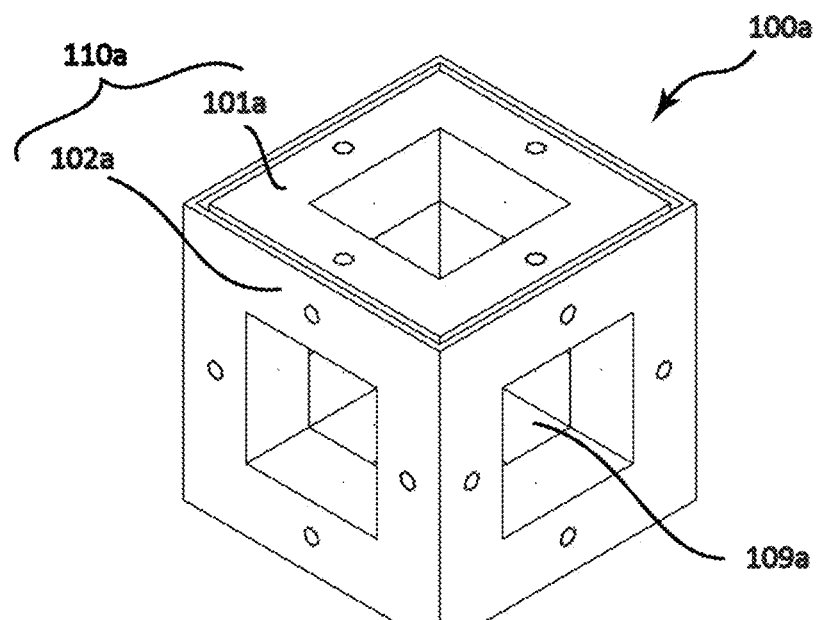
FIG. 2b is a perspective view representation of the force/torque sensor where the casing has a cubic shape, according to one embodiment.

A skilled person will understand that the force/torque sensor 100 could be of any size and shape. FIG. 2b shows an example of a force/torque sensor having a cubic shape 100a. In this specific embodiment, there is one surface of the cube (top) that is linked to the internal frame 101a while the five other surfaces (sides and bottom) are linked to the external frame 102a. This configuration allows multiple devices to be attached to the force/torque sensor 100a at the same time or a single device to alternatively be attached in different orientations. This cubic configuration is also best suitable for applications where the devices that have to be fixed to the force/torque sensor 100a have a squared shape; such as Cartesian manipulators which are often built using squared extrusion members. This embodiment 100a also includes central squared apertures 109a to be able to run objects through it, such as cables or air tubes.

Figure 3:
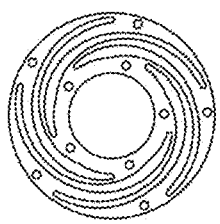
FIG. 3 shows front and perspective view representations of several compliant mechanism architectures of the force/torque sensors, according to one embodiment.
Figure 3:
Figure 3:
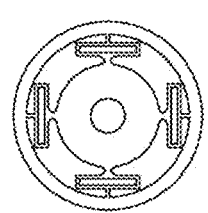
Figure 3:
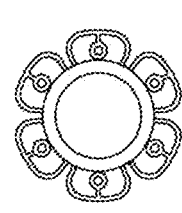
Figure 3:
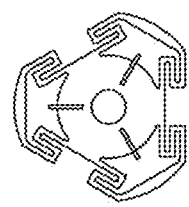
Figure 3:
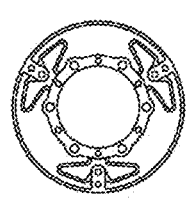
Figure 3:
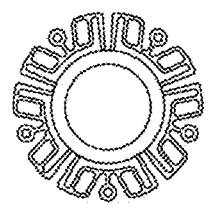
Figure 3:
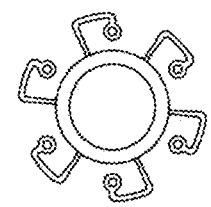
Figure 3:
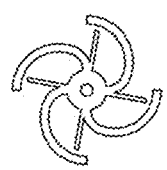
Figure 3:
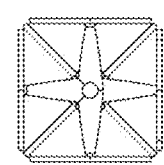
Figure 3:
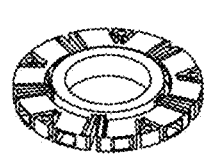
Figure 3:
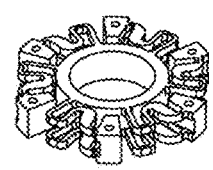
Figure 4:
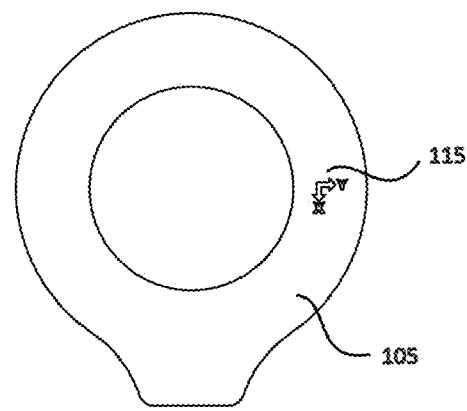
FIG. 4 is a front view representation of the force/torque sensor where the main directions are marked on the lids to ease the integration and the operation, according to one embodiment.

Presented in FIG. 3 are different casing 110 architectures and more specifically different compliant mechanisms 103. The compliant mechanism 103 could be of any shape and size. Different architectures will offer different dynamic motions as well as different force/torque scales for the sensor 100. Hence in some application the force/torque sensor 100 would require a good stiffness while in others, compliance would be beneficial. Same thing for the scale of force/torque, the range will depend on the application and the geometry and the size of the compliant mechanism could be adapted to this purpose. The geometry of the compliant mechanism 110 also affects the dynamic motion of each axis of the force/torque sensor 100. It is hence understood that the stiffness of each axis would not necessarily be the same and that this characteristic of the compliant mechanism 103 could be adapted depending on the application, Presented in FIG. 4 is a front view of a lid (105 or 106) of the force/torque sensor. The main directions 115 could alternatively be marked on the lids to ease the integration and the operation of the force/torque sensor 100.

Part 1—First Embodiment

Figure 5:
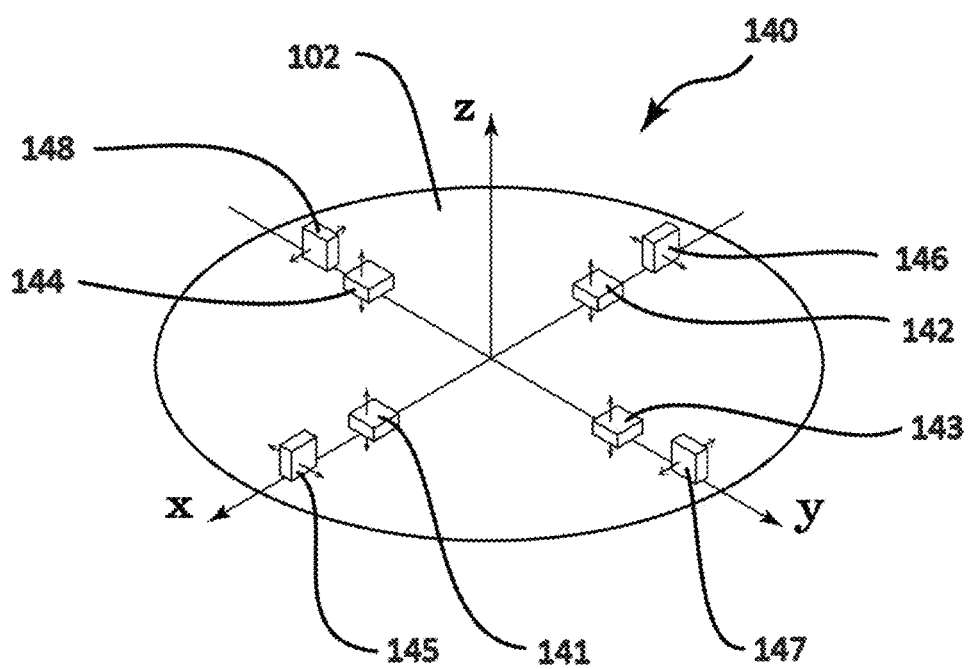
FIG. 5 is a schematic perspective view representation of the force/torque sensor where 8 single-axis measure elements are disposed on a plane to measure all 6-DOFs, according to one embodiment.

FIG. 5 shows a schematic isometric view of a first embodiment 140 of the measure elements 104 in a force/torque sensor 100. In this embodiment 140, 8 single-axis measure elements (141 to 148) are used to measure all 6 degrees of freedom of a force/torque sensor 100. It is understood that this architecture 140 or other similar variations could be used with force/torque sensors 100 having less DOFs. In this embodiment of the invention, the measure elements 104 are completely independent of the compliant mechanism 103 that links the frames 101 and 102. This way, the compliant mechanism 103 could be of any architecture since the measure elements 104 does not measure the displacement (extension or compression) of any part of it but the global displacement (translations and rotations) of the frames 101 and 102 one to each other. In FIG. 5, for clarity, only the fixed frames 102 is shown and moving frame 101 and compliant mechanism 103 is not. All 8 single-axis measure elements (141 to 148) are arranged on a plane (here the x-y plane) and fixed to the moving frame 101. A first measure element 141 is on the positive side of the x-axis and pointing in the positive side of the z-axis. This measure element 141 can only measure local displacements of the casings in z direction. A second measure element 142 is on the negative side of the x-axis and pointing in the positive side of the z-axis. This measure element 142 can only measure local displacements of the casings in z direction. A third measure element 143 is on the positive side of the y-axis and pointing in the positive side of the z-axis. This measure element 143 can only measure local displacements of the casings in z direction. A fourth measure element 144 is on the negative side of the y-axis and pointing in the positive side of the z-axis. This measure element 144 can only measure local displacements of the casings in z direction. A fifth measure element 145 is on the positive side of the x-axis and pointing in the positive side of the y-axis. This measure element 145 can only measure local displacements of the casings in y direction. A sixth measure element 146 is on the negative side of the x-axis and pointing in the positive side of the y-axis. This measure element 146 can only measure local displacements of the casings in y direction. A seventh measure element 147 is on the positive side of the y-axis and pointing in the positive side of the x-axis. This measure element 147 can only measure local displacements of the casings in x direction. An eighth measure element 148 is on the negative side of the y-axis and pointing in the positive side of the x-axis. This measure element 148 can only measure local displacements of the casings in x direction.

Shown in FIGS. 6a and 6b are schematic front views of the sensor architecture 140. In these figures, only 2 measure elements 145 and 146 are shown to explain the concept proposed in this embodiment of the invention. Those measure elements 145 and 146 measure the local distance between the fixed frame 102 and the moving frame 101. In neutral state, so under no force and no torque, the two frames 101 and 102 should be parallel and the measure elements 145 and 146 would measure the distances 155 and 156 respectively, which are referred as the neutral measure values. Those distances 155 and 156 should theoretically be the same but because of tolerances in the fabrication or other imperfections, they could be slightly different. To correct that, a mechanical calibration could be done. The mechanical calibration of the measurements of each measuring element when zero force/torque is applied can be done by placing the sensor in a steady position with no force applied on it. The measurements of each measuring element is then stored in a non-volatile memory of the processor. These stored values are latter subtracted from the measurements to compensate for the fabrication errors of the sensor.

FIG. 6a shows a case where a force is applied to the moving frame 101 of the force sensor 100 only in the positive direction of the Z axis. In this case, the moving frame 101 will move away from the fixed frame 102 to the position 101'. Measure elements 145 and 146 will then measure larger distances; respectively 155' and 156'. Since the force is only applied in the Z axis direction, distance 155' and 156' shall be the same (after calibration correction, if needed).

FIG. 6b shows a case where a positive torque around the Y axis is applied to the moving frame 101 of the force sensor 100. In this case, the moving frame 101 will rotate around they axis to get the orientation 101". Measure elements 145 and 146 will then respectively measure larger distance 155" and shorter distance 156". Since, in this case, only a torque is applied around the Y axis, the norm of the difference between neutral and final distances of each measure elements 145 and 146 shall be the same (again after calibration correction, if needed): |155"-155|=|156"-156|

To increase the precision of the force/torque measurement, the measure elements can be embodied in an oscillating circuit as illustrated in FIG. 6c such that the output frequency varies with the displacement of the measure elements. The variable capacitance is integrated into a circuit comprising a resistor and an inverting Schmitt trigger. The output of the inverting Schmitt trigger is connected to its input through a resistor. The variable capacitance is connected to the input of the Schmitt Trigger and to the ground. As such, the output of the Schmitt trigger is an oscillating signal for which the frequency is determined by the value of the resistor, the variable capacitor and the threshold points of the Schmitt trigger. By measuring the signal frequency, it is possible to estimate the variable capacitance which is a function of the distance between the two planes of the sensing element.

An apparatus can then be used to count the number or falling (or rising) edges of the signal during a precise period of time, as illustrated in FIG. 6d. Furthermore, as represented in FIG. 6e, an additional measurement precision can be obtained if the time is measured between the last edge of the signal and the end of the acquisition period. The advantage of such acquisition method is that the precision is very high for a very large variation of the measured distance without the need of any adjustment to compensation for variation of the system. An oscillating signal is also typically more immune to external electrical noise.

Figures 7, 8:
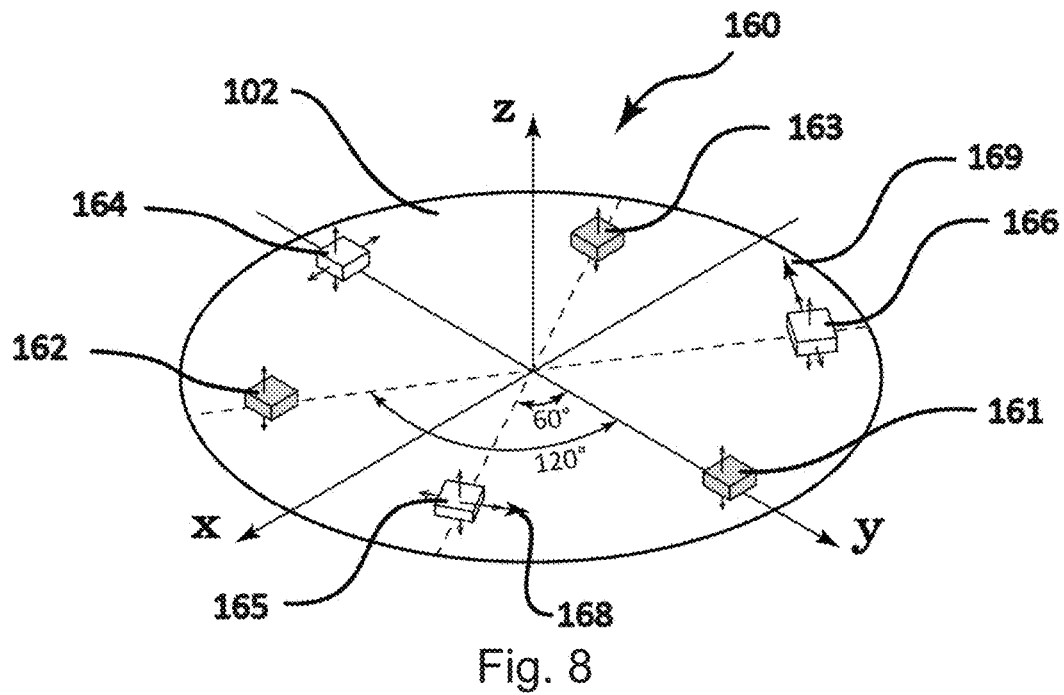
FIG. 7 is a table resuming the effects on the measure elements of the force/torque sensor when forces/torques are applied to the casings, according to one embodiment presented in FIG. 5.
FIG. 8 is a schematic perspective view representation of the force/torque sensor where 3 single-axis measure elements and 3 double-axis elements are disposed on a plane to measure all 6-DOFs, according to one embodiment.

FIG. 7 shows a summary table for the different single force/torque that could be applied to a 6-axis force/torque sensor and the resulting measures that would be detected by the different measure elements (141 to 148) of FIG. 5. A plus sign in the table means that, for a positive force/torque along the associated axis, the measure will be larger than its associated neutral value while a minus sign means that the measure will be smaller than its associated neutral value. A blank cell means that this measure element is not involved in the given force/torque measurement.

A skilled person will understand that in the case where there are forces/torques in various directions at the same time, the case of each force/torque (summarized in FIG. 7) will need to be "summed" to get the final result.

This architecture 140:
  eases the calibration of the force/torque sensor 100
  allows to position the measure elements 104 in such a way that it will optimize the stroke of the displacements in function of the applications
  facilitates the force and torque computation since they are partially decoupled (as shown in FIG. 6)

Part 1—Second Embodiment

FIG. 8 shows a second embodiment 160 of the first part of the invention where all the measure elements (160 to 166) have at least one measure axis oriented in the same direction (here, in the Z-axis direction). In this embodiment 160, 3 single-axis measure elements (161 to 163) as well as 3 double-axis measure elements (164 to 166) are used to measure all 6 degrees of freedom of a force/torque sensor 100. It is understood that this architecture 160 or other similar variations could be used with force/torque sensors 100 having less DOFs. In this embodiment of the invention, the measure elements (161 to 166) are completely independent of the compliant mechanism 103 that links the frames 101 and 102. This way, the compliant mechanism 103 could be of any architecture since the measure elements (161 to 166) does not measure the displacement (extension or compression) of any part of it but the global displacement (translations and rotations) of the frames 101 and 102 one to each other. In FIG. 8, for clarity, only the fixed frame 102 is shown. All 6 measure elements (161 to 166) are arranged on a plane (here the X-Y plane) and attached to the fixed frame 102. A first one-axis measure element 161 is on the positive side of the Y-axis and pointing in the positive side of the Z-axis. This measure element 161 can only measure local displacements of the casings in the Z direction. A second one-axis measure element 162 is located at −120° of the measure element 161 and pointing in the positive side of the Z-axis. This measure element 162 can only measure local displacements of the casings in Z direction. A third one-axis measure element 163 is located at 120° of the measure element 161 and pointing in the positive side of the Z-axis. This measure element 163 can only measure local displacements of the casings in Z direction. A first two-axis measure element 164 is on the negative side of the Y-axis and its first measure axis is pointing in the positive side of the Z-axis while the second measure axis is pointing in the positive side of the X-axis. This measure element 163 can measure local displacements of the casings in Z direction as well as in the X direction. A second two-axis measure element 165 is located at 120° of the measure element 164 and its first measure axis is pointing in the positive side of the Z-axis while the second measure axis is pointing in the positive side of the axis 168. This measure element 165 can measure local displacements of the casings in Z direction as well as in the direction of the axis 168. A third two-axis measure element 166 is located at −120° of the measure element 164 and its first measure axis is pointing in the positive side of the Z-axis while the second measure axis is pointing in the positive side of the axis 169. This measure element 166 can measure local displacements of the casings in Z direction as well as in the direction of the axis 169.

This architecture 160:
  eases the calibration of the force/torque sensor 100,
  allows to position the measure elements 104 in such a way that it will optimize the stroke of the displacements in function of the applications,
  simplifies the fabrication of the force/torque sensor since all measure elements 104 are lying on a same plane and that at least one axis of all measure elements 104 are pointing in the same direction.

Example of the Second Embodiment with Capacitive Sensors

Figure 9:
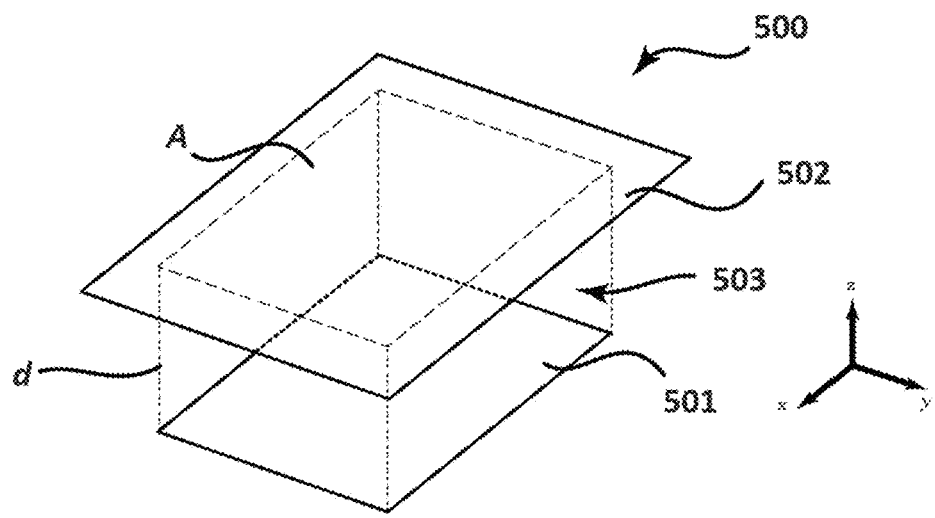
FIG. 9 is a prior art representation of a single-axis capacitive displacement sensor element.

Presented in FIG. 9 is an isometric view of a classical capacitive displacement sensor element 500. It is composed of two conductive plates 501 and 502 on which a charge is applied and a dielectric material 503 between the two plates 501 and 502. The capacitance C of this element 500 can be expressed by:

$$C = \frac{\varepsilon_0 K A}{d}$$

Where C is the capacitance, co is the known permittivity of free space constant, K is the known dielectric constant of the material in the gap 503, A is the conjoint area of the plates 501 and 502, and d is the distance between the plates 501 and 502. Hence, it is possible with such sensor to compute the displacement in z direction, that corresponds to variation in 'd' in the previous equation, by measuring the capacitance variation (difference in 'C') electronically.

Figure 10:
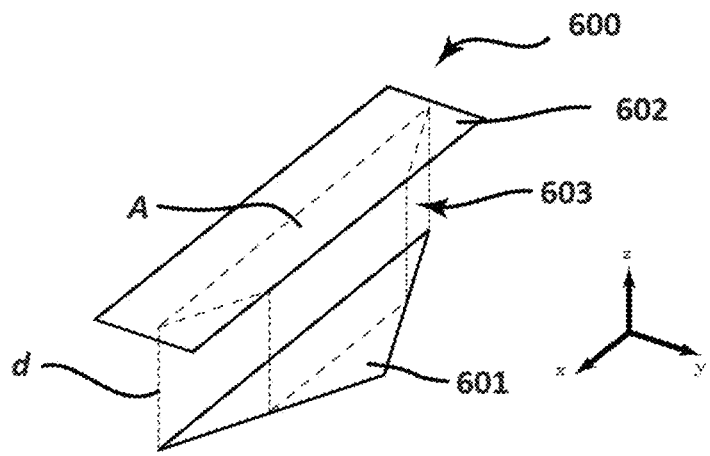
FIG. 10 is a prior art representation of a double-axis capacitive displacement sensor element.

FIG. 10 shows how to use capacitive sensors to be able to measure displacement in more than one direction simultaneously (multi-axis measurement). FIG. 10 shows a sensor that is able to measure the displacement in two dimensions but this concept could be extended to more dimensions. Again the sensor is composed of two conductive plates 601 and 602 on which a charge is applied and a dielectric material 603 between the two plates 601 and 602. The two plates 601 and 602 are overlapped in one direction (here in the y direction) so the Conjoint Area (A) will increase or decrease if the plates 601 and 602 are moving one to another in the Y direction. Note that in this specific case, the relative movement of the plates in the x direction will have no effect since the Conjoint Area (A) will not change (for small displacements). As for the classical capacitive displacement sensor element 500 of FIG. 9 the relative movement of the plates 601 and 601 one to each other in the Z direction will also affect the capacitive value. Finally note that the shape of the plates could be of any shapes or size. It is possible, for example, to design the plates in such a way that a same displacement in the two directions will produce a capacitance variation of a similar scale.

Figure 11C:
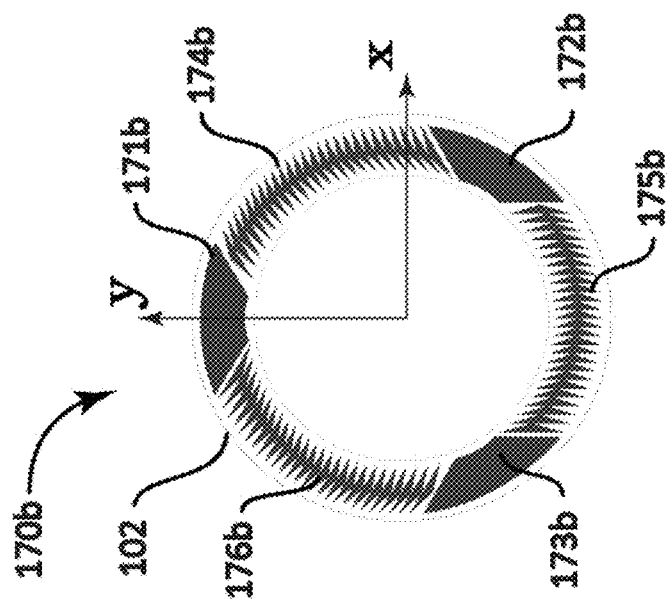
FIG. 11c is a schematic front view representation of the force/torque sensor where 3 single-axis measure elements and 3 double-axis elements are disposed on a plane to measure all 6-DOFs, showing fixed frames and its measure elements, according to one embodiment.
Figure 11B:
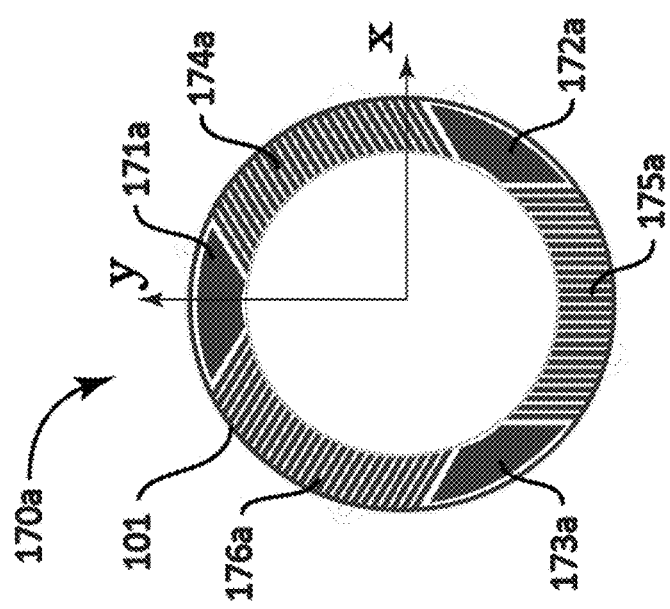
FIG. 11b is a schematic front view representation of the force/torque sensor where 3 single-axis measure elements and 3 double-axis elements are disposed on a plane to measure all 6-DOFs, showing moving frames and its measure elements, according to one embodiment.
Figure 11A:
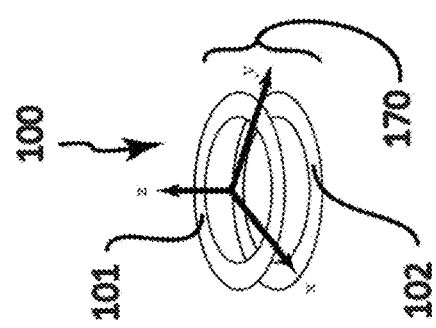
FIG. 11a is a schematic perspective view representation of the force/torque sensor where 3 single-axis measure elements and 3 double-axis elements are disposed on a plane to measure all 6-DOFs, showing the frames, according to one embodiment.

FIGS. 11a, 11b and 11c show an example configuration of the second embodiment 170 of the first part of the invention where all the measure elements (171 to 176) are capacitive sensors. In this embodiment 170, 3 double-axis capacitive measure elements (174 to 176) as well as 3 single-axis capacitive measure elements (171 to 173) are used to measure all 6 degrees of freedom of a force/torque sensor 100. It is understood that this architecture 170 or other similar variations could be used with force/torque sensors 100 having less DOFs. In this example of the second embodiment of the invention, the measure elements (171 to 176) are completely independent of the compliant mechanism 103 that links the frames 101 and 102. This way, the compliant mechanism 103 could be of any architecture since the measure elements (171 to 176) does not measure the displacement (extension or compression) of any part of it but the global displacement (translations and rotations) of the frames 101 and 102 one to each other. In FIG. 11, for clarity, only the fixed frame 102 and moving frame 101 are shown. The 3 single-axis capacitive measure elements (171 to 173) and the 3 double-axis measure capacitive elements (174 to 176) are arranged on a plane (here the X-Y plane) and are alternately and evenly distributed (at every 60° about the z-axis) as explained for FIG. 8.

Presented in FIGS. 11b and 11c are respectively the moving 101 and the fixed 102 frames of the sensor and their associated measure components. The 3 single-axis capacitive plates 171a, 172a and 173a of the moving frame 101 of FIG. 11b are associated with the 3 single-axis capacitive plates 171b, 172b and 173b of the fixed frame 102 of FIG. 11c. The 3 double-axis capacitive plates 174a, 175a and 176a of the moving frame 101 of FIG. 11b are associated with the 3 double-axis capacitive plates 174b, 175b and 176b of the fixed frame 102 of FIG. 11c. The 3 double-axis measure elements plates (174 to 176) have "comb" and "fir" shapes respectively for the moving 101 and the fixed 102 frames. Those shapes allow the double-axis capacitive sensor elements (174 to 176) to have similar precision in both directions as well as allowing the capacitance of each element to be increased. It is possible to isolate the variation of the measurements for each of the sensitive dimensions of the double-axis capacitive sensor elements (174 to 176) using the measurements of the single-axis capacitive sensor elements (171 to 173). This is obtained by computing the position and orientation of the plane which contains all the sensor elements using the measurements of the single-axis capacitive sensor elements (171 to 173). Knowing the position and orientation of the plane, it is possible to compute the displacement of the double-axis sensor elements (174 to 176) for the direction which is common to the single-axis sensor elements (174 to 176). It is finally possible to remove the effect of this displacement for the measurement from the double-axis sensor elements (174 to 176) to isolate the effect of the displacement in the other sensitive directions.

Part 2—Apparatus and Method to Teach a Manipulator

The second part of this invention aims at giving human-robot interaction capabilities to manipulators, using a force/torque sensor, in order to make them easier to program.

Figure 12:
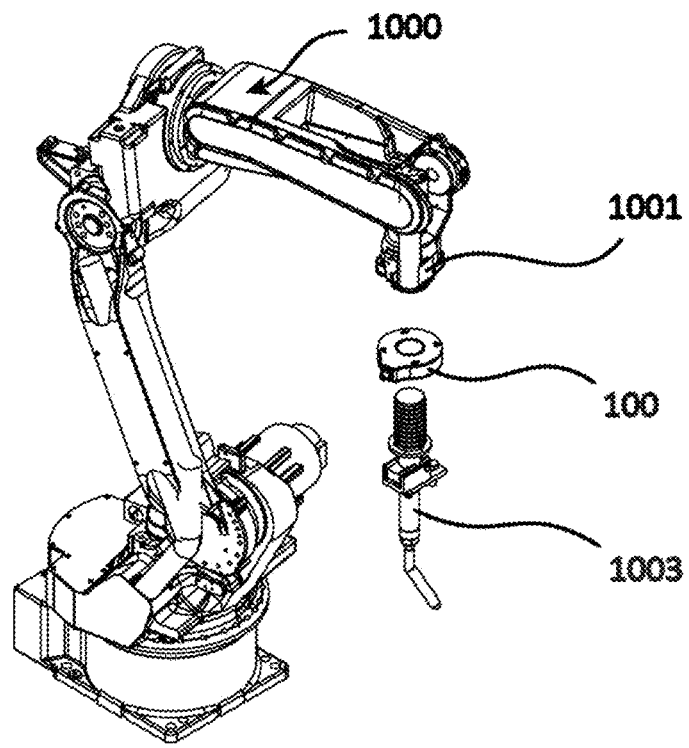
FIG. 12 is a schematic perspective view representation of the apparatus to teach a manipulator by direct contact interaction with a human operator, according to one embodiment.

According to one embodiment, there is presented in FIG. 12 the apparatus to teach a manipulator by direct contact interaction with a human operator. This apparatus is composed of a robot 1000 (in the figure, a 6-DOF robot arm), a sensor 100 (in the figure a force/torque sensor) and an EOAT 1003 (in the figure a robotic welding torch). Note that the end-of-arm 1001 is part of the robot arm 1000. For simplicity, in the other figures, only the end-of-arm 1001 is shown to represent the robot manipulator 1000. The sensor measurements are processed to obtain the user intent on where he wants the manipulator to move in space.

Figure 13:
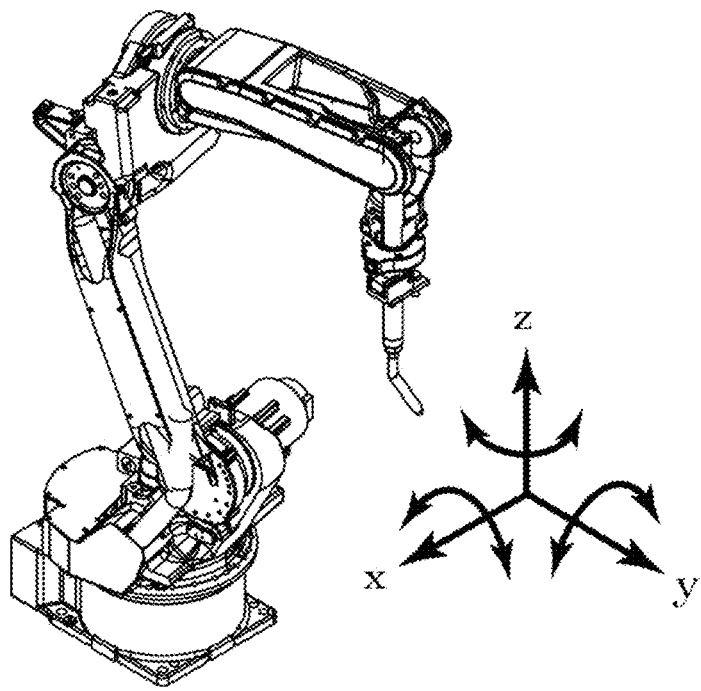
FIG. 13 is a schematic perspective view representation of the apparatus to teach a manipulator by direct contact interaction with a human operator, showing the different DOFs of the apparatus, according to one embodiment.

Presented in FIG. 13 is an isometric view of the apparatus. In this embodiment, the manipulator 1000 can move in 6 dimensions (3 translations and 3 rotations). A skilled person will understand that the manipulator 1000 could be of any type as long as it has at least one degree-of-freedom.

Figure 14:
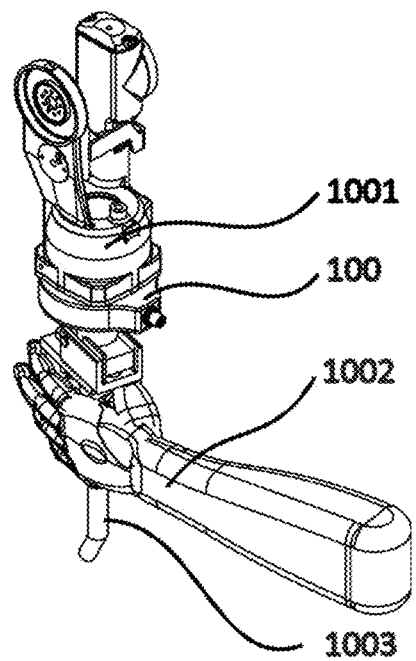
FIG. 14 is a schematic perspective view representation of the apparatus to teach a manipulator by direct contact interaction with a human operator, showing the force/torque sensor fixed between the manipulator and the EOAT, according to one embodiment.

Presented in FIG. 14 are front and isometric views of one embodiment of the teaching apparatus. In this embodiment, a force/torque sensor 100 is fixed between the end-of-arm 1001 of the robot and the robotic tool 1003. In this embodiment, the user will teach the robot by applying forces/torques to the robotic tool 1003 with his body 1002 (here its hand). Those forces/torques are interpreted by the force/torque sensor 100 and are converted into motion of the robot 1001. In this embodiment, the force/torque sensor 100 is intended to be fixed permanently to the robot end-of-arm 1001.

Figure 15:
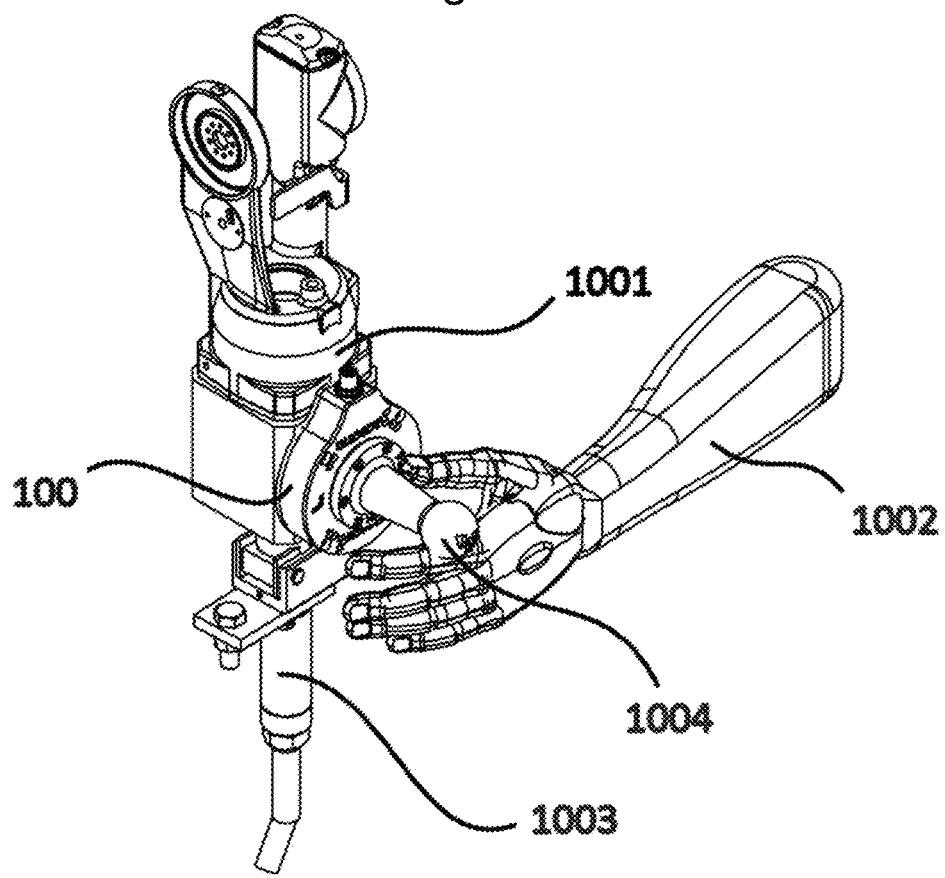
FIG. 15 is a schematic perspective view representation of the apparatus to teach a manipulator by direct contact interaction with a human operator, showing the force/torque sensor and the EOAT fixed between in parallel to the manipulator, according to one embodiment.

Presented in FIG. 15 is an isometric view of a second embodiment of the teaching apparatus. In this embodiment the force/force sensor 100 and the robotic tools 1003 are separately attached to the end-of-arm 1001 of the robot allowing the force/torque sensor to be easily removed after the teaching task. In this embodiment, an handle 1004 could be added to the force/torque sensor 100 to allow the user 1002 to apply force to the force/torque sensor 100. This handle 1004 could also be equipped with any types of user input device (buttons, touch screens, etc.) that could be used to program with specific tasks such as record, play, EOAT settings, logic, etc.

The sensor could be installed at other places in the kinematic chain if not all end-of-arm DOFs need to be positioned. If the manipulator 1000 is kinematically redundant for the process, several sensors could also be placed at different places along the kinematic chain so the desired configuration can be fully controlled by the user.

In the different hardware embodiments, an algorithm needs to be used to process the force/torque sensor information using a control law that allow for a smooth, precise and intuitive robot motion guidance by the user.

It is possible to modify the behaviour of the interaction in certain circumstances, for example if a contact with a hard surface is detected, if the speed is above or below a certain limit or in function of which user is teaching the robot. It is also possible to change the behavior of the interaction in such a way to constrain chosen movements (translations or rotations), making a 6 DOFs robot moves such as a Cartesian one or rotational one for instance.

In the different hardware embodiments, it is possible to compensate for the weight of the tool 1003 or the weight of the handle 1004 that is attached to the force/torque sensor 100. For this task, there are two ways to do it:

The robot controller sends the force/torque created by the weight of the tool/handle for its current configuration.

The sensor processor computes the tool/handle orientation using an internal 3-axis accelerometer and uses pre-calibrated information related to the weight of the tool to calculate and remove its effect on the force/torque measurements.

The resulting manipulator 1000 movement must comply with both process requirements and user ergonomy. The algorithm must allow positioning of the EOAT that is precise enough for the given process. The movement need to be easy enough to generate so it does not induce strain to the user that is teaching the robot.

It is possible to include safety features in the sensor itself. For example, any overload of the sensor could result in the output of zero for the motion of each axis, effectively stopping the robot. Also, internal accelerometer could be used to detect any collision and react appropriately, for example by stopping the robot or moving in the opposite direction to prevent any damage. The force/torque sensor 100 should be designed to send zero motion data by default, only sending meaningful data if all safety criteria are met.

During the robot movement or at a specific point, the robot position can be recorded using a user input device that can take many forms. It can be button(s) on the traditional teach pendant or buttons on the sensor or other input devices. This user input interface can also be used to block given manipulator DOF if desired by the user. The same input device or another one can be used to input process information. Accessories can be added to end-of-arm-tool to aid the teaching (i.e. welding tip, gripper jig, etc.).

Figure 16:
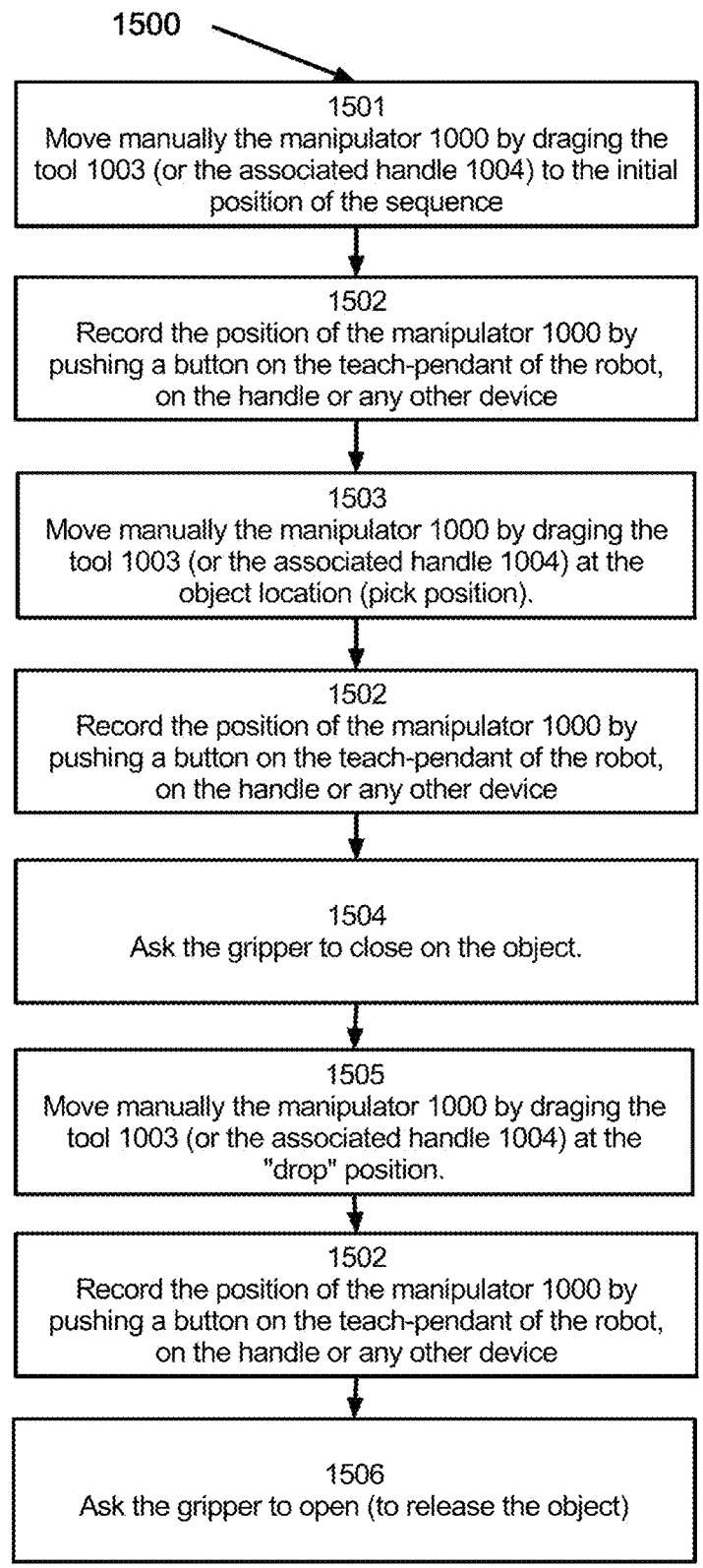
FIG. 16 is a flow chart diagram of a method for operating the apparatus to teach a manipulator by direct contact interaction with a human operator in a pick-and-place application.

FIG. 16 shows an example of a sequence 1500 that a user would need to follow to teach a manipulator to do a simple pick and place operation with the apparatus explained previously. In this example, the manipulator starts at an initial position, move to a predefined position where it can reach the object, grab the object, move to another predefined position where it has to drop the object and finally drop the object.

Figure 17:
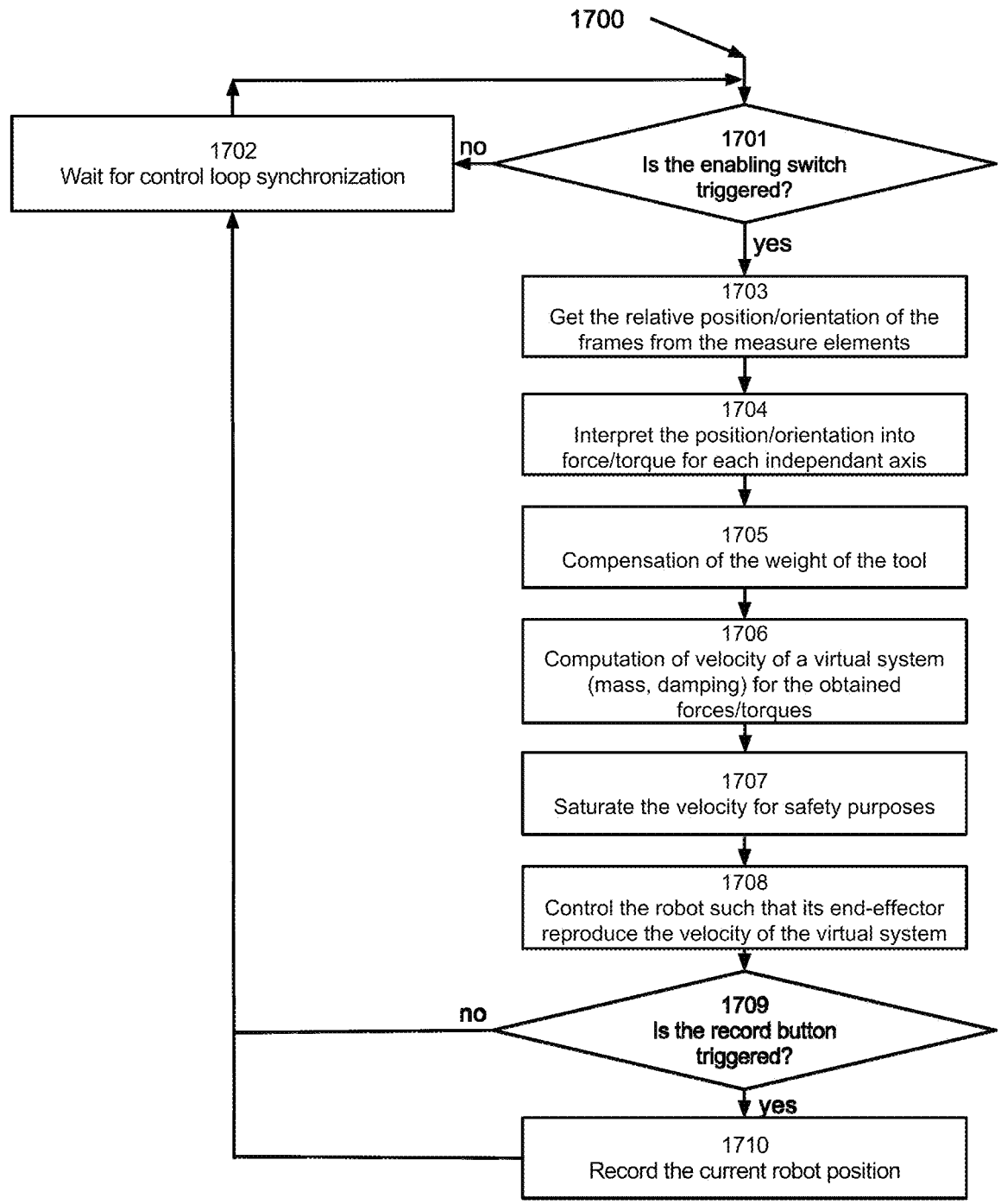
FIG. 17 is a flow chart diagram of a method for controlling the apparatus used to teach a manipulator by direct contact interaction with a human operator in a pick-and-place application.

FIG. 17 shows the method 1700 used to control the robot using the sensor feedback in order to accomplish the example described above (FIG. 16). In this method, the robot is not moving unless an enabling switch is triggered by the user. When the enabling switch is activated, the sensor performs computations to determine the robot velocity. Sequentially, the capacitance of each sensing element is measured. Using the sensor calibration located in a non-volatile memory, the capacitance is converted in displacement for each sensing element, which are in turn converted to forces/moments applied on the sensor. The pre-calibrated weight of the tool is removed from the measured forces/torques. These efforts are then introduced in a virtual model representing a virtual object moving in a virtual environment. Using the previously computed velocity and the actual forces/torques, the output velocity of the virtual system is updated. The robot is then controlled to make its end-effector move with this velocity, limited for safety purposes. The loop is then synchronized to make sure that the output velocity is updated at a fixed frequency. However, if the user presses a specific button, the current position of the robot is saved in the robot memory for future playback.

The proposed method to control the motion of a robot has many advantages over the use of a joystick or such device located anywhere else than on the robot, for example on a fixed table near the robot or on the teach pendant. First, although a joystick has the advantage of allowing the control of a precise and constant velocity, displacing the end-effector of the robot directly is more precise in terms of position since the applied force (and the resulting velocity) is reduced as the robot is moving. Also, with the proposed approach, the resulting velocity is always in the same direction as the applied force, which is not the case with a fixed joystick and a rotating end-effector. This simplifies the control of the robot as the user never has to think about which action creates which motion. Finally, the interaction is more natural if the user is applying forces directly on the tool. For example, if the tool on the end-effector is a welding torch, the user will be able to move the torch in the same manner as if there was no robot. This further simplifies the use of such system to record points and trajectories.

Part 3—Interface to Teach a Manipulator/Robot

The third part of this invention aims at giving a human-robot or human-manipulator interaction capabilities by providing a user-friendly interface for programming a robot or manipulator with ease.

It has been discovered that a user friendly human-manipulator interface allows a user to program, test and playback a sequence of instructions for a manipulator to execute without requiring knowledge of an associated manipulator programming code language. It has further been discovered that during a manipulator programming process, a user-friendly interface allows a user to provide relatively quick edits of operational instruction recordings. It has further been discovered that a user friendly human-manipulator interface allows a user to understand a meaning of a programing instruction without the use of words. The user-friendly interface may be part of a programming device as presented in FIG. 18A or part of any other suitable programming device. The programming device may have various suitable shapes or forms that may include physical or virtual button(s) that are positioned/displayed on a traditional teach pendant or that are positioned/displayed on a manipulator sensor or that are positioned/displayed on any other suitable input device that may transfer data to/from a manipulator by cable or radio waves.

The interface may be used for programming the manipulator in conjunction with other methods of programming the manipulator, including methods that consist of programming a manipulator by teaching or recording a motion. For instance, during or following the recording of a robot movement or a robot pause, additional or complementary operational instructions can be programmed using the programming device. According to one embodiment, the interface allows the user to program manipulator instructions with only a single click or only a few clicks without having to input programming code. This way, when the manipulator is located in a desired position or moving in a taught manner, the user may effectively and quickly input a desired instruction to include additional instructions, to enhance a taught motion or to provide adjustments instructions. As will be further described below, various instructions may be programmed according to the type of manipulator. According to one embodiment, an instruction is defined by a selected action type and inputted parameters.

Figure 18A:
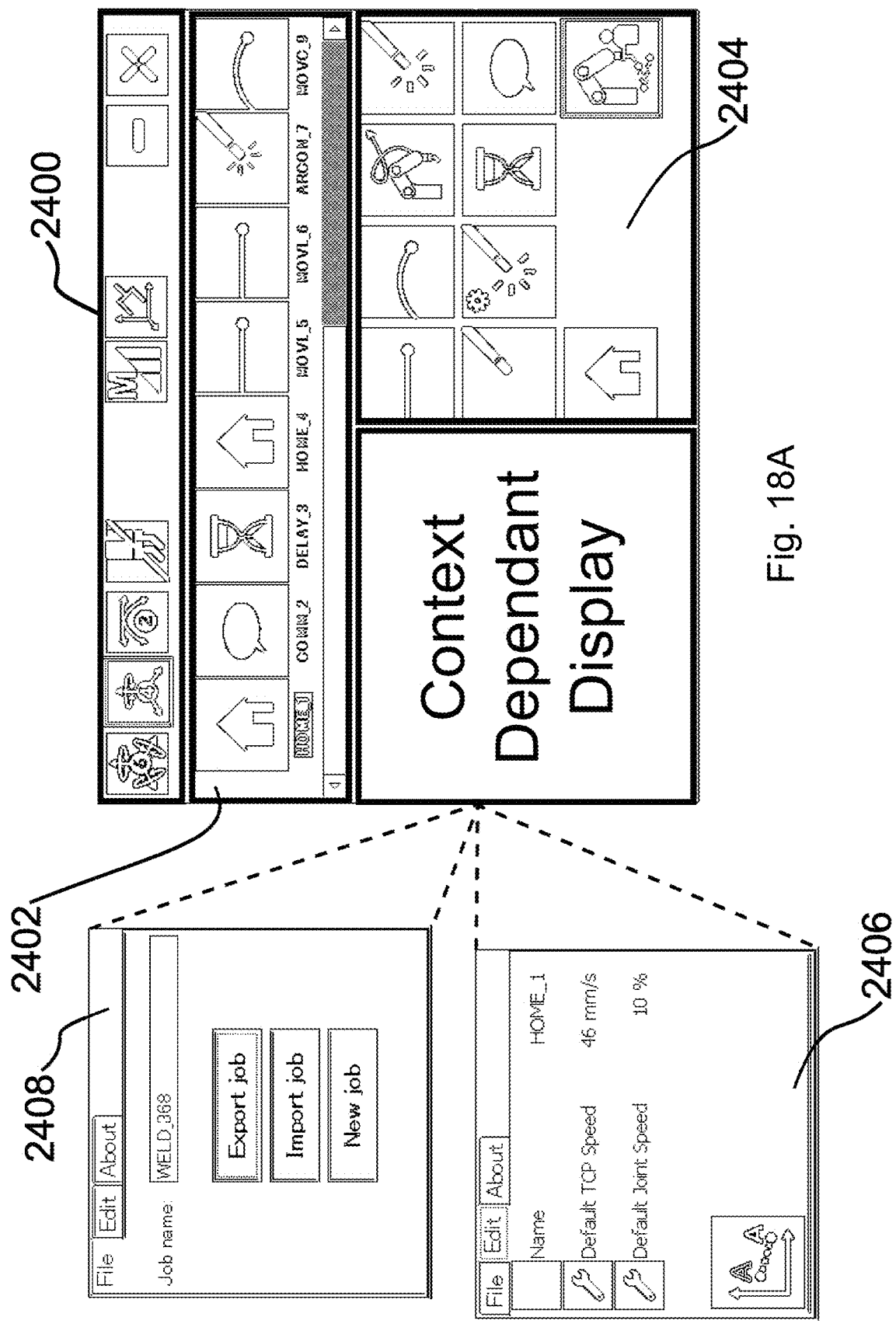
FIG. 18A is a representation of a graphical user interface for a programming device, the graphical user interface presenting an operation sequence interface, an action type toolbox interface, an Import/Export interface and a parameter interface, according to one embodiment.

As presented in FIG. 18A, the user programming device has a user interface 2400 for allowing an end-user to provide instructions to the manipulator. According to one embodiment, the user interface 2400 has an operation sequence interface 2402, a toolbox interface 2404, a parameters interface 2406 and an import/export interface 2408.

Operation Sequence Interface:

Presented in FIG. 18A, the operation sequence interface 2402 is used at various program development phases such as when the program is being built, tested and modified. The sequence interface may also be used during production play-back and give an indication of the sequence progress.

Figure 18B:
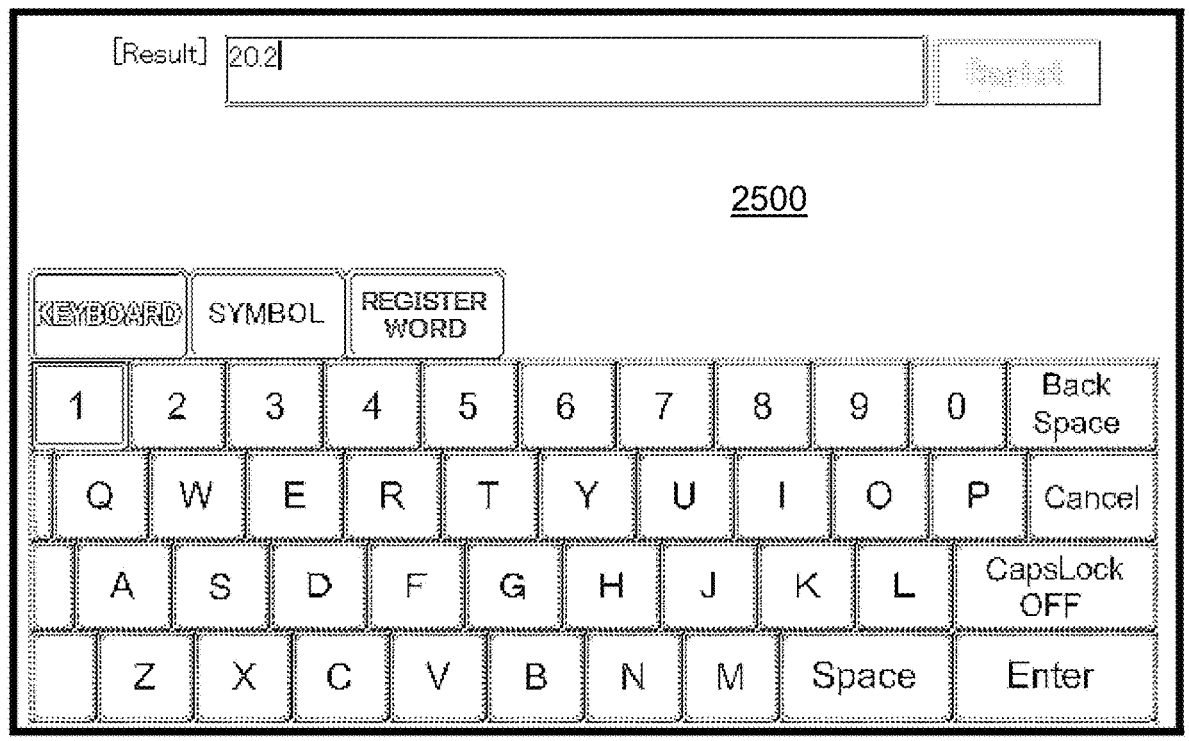
FIG. 18B is a representation of a keyboard display for editing a parameter value for a parameter selected from the parameter interface, according to one embodiment.
Figure 18C:
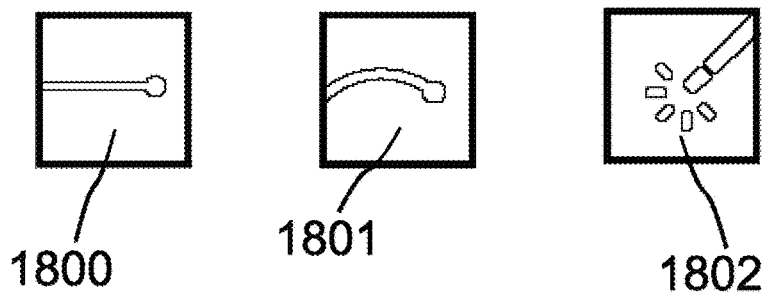
FIG. 18C is a representation of icons that are each indicative of an action type, according to one embodiment.

The operation sequence interface 2402 provides for communicating to the user an operation sequence of instructions that is being programmed or that has been programmed for the manipulator to execute. According to one embodiment, the operation sequence is represented as a list of icons each depicting an instruction for performing an action. Presented in FIG. 18B are three icons applicable to a welding process: straight line motion instruction 1800, circular path motion instruction 1801 and start a welding process instruction 1802. As can be noticed, the meaning of each icon is easily and readily recognizable by the end-user looking or even glimpsing at them. Depending on the area of application, there may be different or additional icons. The icons may have various shapes and forms that differ from the ones presented in FIG. 18B such that the user can recognize and understand their meaning with relative ease.

In one embodiment of the operation sequence interface 2402, the icons are color coded for an end-user to associate an icon to a particular portion of the operation sequence. For example, a welding path could be highlighted in a different color for indicating to the user that something particular is happening during the associated sub-sequence. A skilled person will understand that other ways of highlighting a sub-sequence may be used for informing the user that something particular is happening during that sub-sequence.

In another embodiment of the operation sequence interface 2402, a succession of instructions that the manipulator must execute is represented in at least three parts. As presented in FIG. 19A, a first part represents a current instruction 1810, a second part represents a previous instruction 1811 and a third part represents a next instruction 1812. In addition, there is presented to the end-user a progress indicator 1813 of a selected instruction position with respect to a complete sequence of instructions length. In this FIG. 19A, the progress indicator 1813 is represented within a progress bar, however other ways of representing a sequence progress to the user may also be considered without departing from the scope of the present invention.

During the program development phases, the operation sequence interface 2402 allows a user to add or remove instructions from the sequence. As presented in FIG. 19A, a current instruction can be selected by the user in order to delete it from the sequence, modify its parameters, insert a new instruction after it or replace it by another instruction. In one example, a current instruction 1810 is selected by the user as shown by the highlighted box for indicating to the user that instruction 1810 is the current instruction after which a new instruction will be inserted.

During play-back, the operation sequence interface 2402 is used to inform the user concerning the manipulator's current position and current instruction being executed. According to one embodiment, with the operation sequence interface 2402 the user can order the robot to jump to a specific instruction by selecting a desired instruction from the sequence.

Toolbox Interface

The toolbox interface 2404 presents to the user the available action types that may be inserted in the sequence, as depicted in FIG. 18A.

According to one embodiment, the toolbox interface 2404 presents icons to the user, each icon depicting a specific function or action type. Without the use of words, the icons provide an intuitive way for the user to program a sequence of instructions or action types. The user may find it easier to remember the function each icon represents. The user may further identify or discern the function of each icon easily and rapidly by simply looking or even glancing at each icon. The icons may hold additional information such as an indicator that may be a color indicator or a grayed-out icon for informing the user that a specific action type may not be inserted in the operation sequence or at a particular position of the operation sequence. Additional information may also be presented to the user via an icon overlay.

A skilled person will understand that an icon may present to the user other types of additional information and that in various different manners than those mentioned above, without departing from the scope of the present toolbox interface 2404.

While in the toolbox interface 2404, icons are presented for depicting an action type, various other user-friendly manners of presenting an action type may be used without departing from the scope of the present invention. In one example, a physical or virtual numeric keypad is presented and to each key of the keypad is associated a predefined action type. In another example, physical or virtual buttons are presented, each button having an associated word or phrase describing a corresponding action type.

According to one embodiment, the action types are of two kinds: movement specific action types and application specific action types. Movement specific action types are universal instructions that are common among different types of robots and across various areas of application. For example, such action types non-restrictively include: moving along a linear path, moving along a circular path, moving along a spline and optimizing joint speed. Application specific action types are likely to differ depending on the area of application and robot type. For example, in a welding application, action types may include: turn on welding torch, adjust flame, turn off welding torch, etc. In a gripping application action types may include: pick up, place down, push, pull, etc.

Parameters Interface

Figures 19A, 19B:
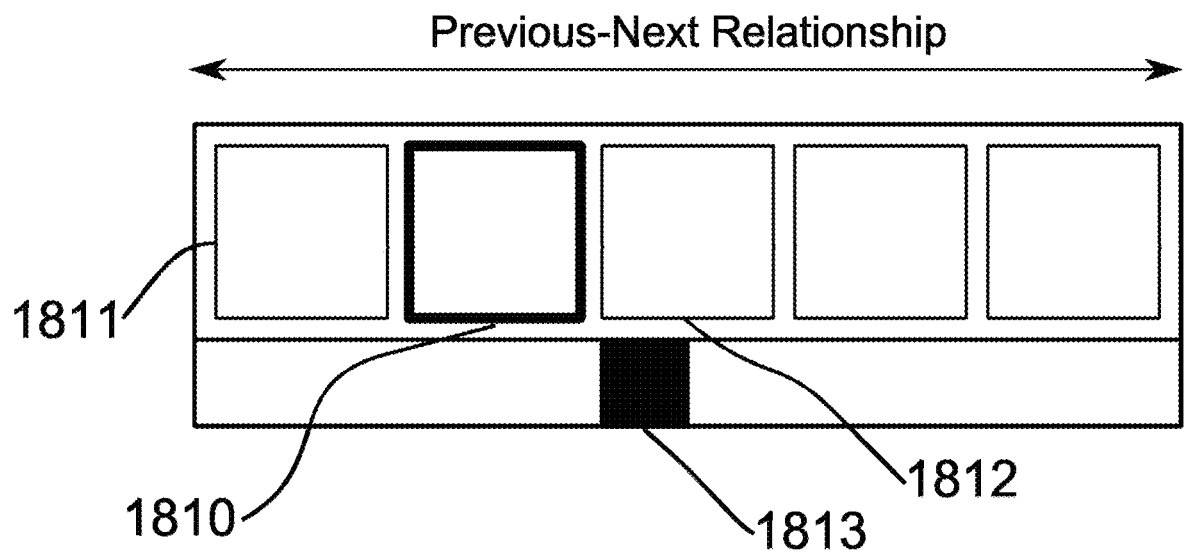
FIG. 19A is a representation of the operation sequence interface of the graphical user interface of FIG. 18A, according to one embodiment.
FIG. 19B is a representation of a parameter configuration file that may be imported into the programming device, according to one embodiment.

According to one embodiment, during a playback of the instructions, the parameter interface 2406 provides an indication of the parameters used for a current instruction 1810 selected from the operation sequence interface 2402, as presented in FIGS. 18A and 19A. During programming of the instructions, the parameter interface 2406 further allows the user to read, add and modify parameters associated to the current instruction 1810. Also, during programming of the instructions by selecting an action type from the toolbox interface 2404, the parameter interface 2406 may allow the user to define parameters associated to a selected action type or to edit default parameters that are associated with the selected action type.

According to one embodiment, as presented at FIG. 18A, the parameter interface 2406 presents a set of parameters that are associated to a current instruction 1810 or to a selected action type. The parameter interface 2406 further presents a key depicting icon next each parameter that may be edited. For modifying a value of one of the editable parameters, the user may select the corresponding key depicting icon and a corresponding parameter definition interface XXX is then displayed, as presented in FIG. 18B. With this interface XXX, the user may edit the parameter as desired. It is understandable that a new parameter may also be added in the same way by presenting the same parameter definition interface XXX or any other suitable interface.

According to one embodiment, the parameters presented to the user are in limited numbers and are restricted to only the parameters related to the current instruction 1810 or the selected action type from the toolbox interface 2404. Moreover, the parameters may be restricted to only a necessary subset determined for example according to a current position of the manipulator. Such limitations and restrictions provide for enhanced interface usability.

Figure 19C:
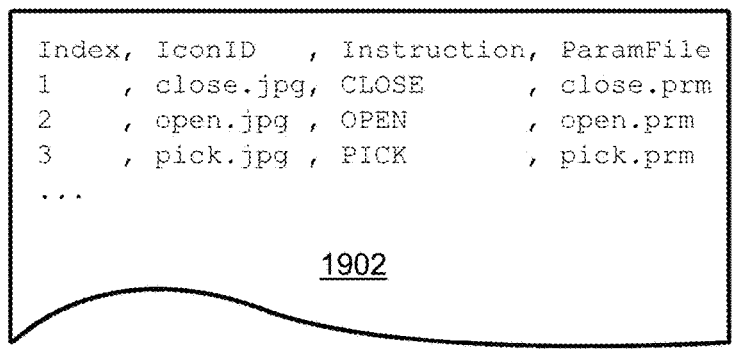
FIG. 19C is a representation of an action type configuration file that may be imported into the programming device, according to one embodiment.

According to one embodiment, the toolbox 2404 includes action types that are customizable and may require a customization of parameters. According to one embodiment, an action type configuration file 1902 may be read by the programming device in order to associate a set of parameters to a customizable action type, as presented in FIG. 19C. In an alternate embodiment, a parameter configuration file 1900 holds the set of parameters associated to a defined customizable action type, as presented in FIG. 19B.

Import/Export Interface

According to one embodiment, the programmed sequence of instructions may be exported from a first programming device and imported into another programming device or multiple other programming devices. This allows for multiple robots to reproduce the same instructions in parallel or to produce a backup of the programmed sequence of instructions.

Presented in FIG. 18A, the Import/Export interface 2408 allows the user to select an Export function button for exporting the programmed sequence of instructions of the programming device. The interface 2408 also allows the user to select an import function button for importing a programmed sequence of instructions into the programming device.

Figure 20:
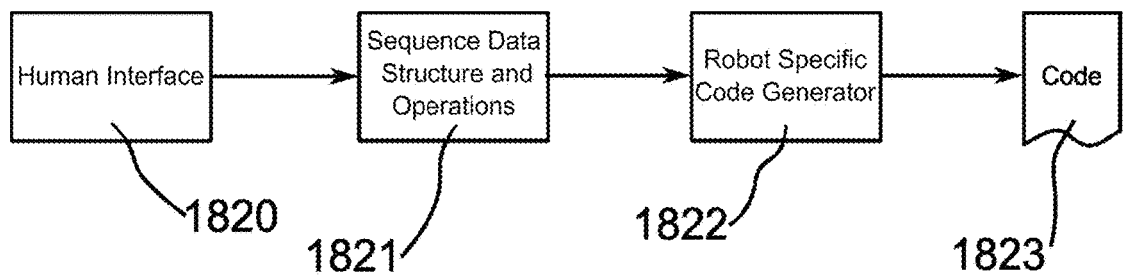
FIG. 20 is a data flow diagram representing the exporting of a programmed sequence of instructions as a manipulator native code file, according to one embodiment.

According to one embodiment, the programmed sequence of instructions is a code that is readable by the manipulator. As presented in FIG. 20, when the user selects the Export function button, the programmed sequence of instructions represented by a sequence data structure 1821 is read by a code generator 1822. The code generator 1822 then converts the sequence into the manipulator's native code 1823. The manipulator's native code 1823 is then exported as a program code file.

Figure 21:
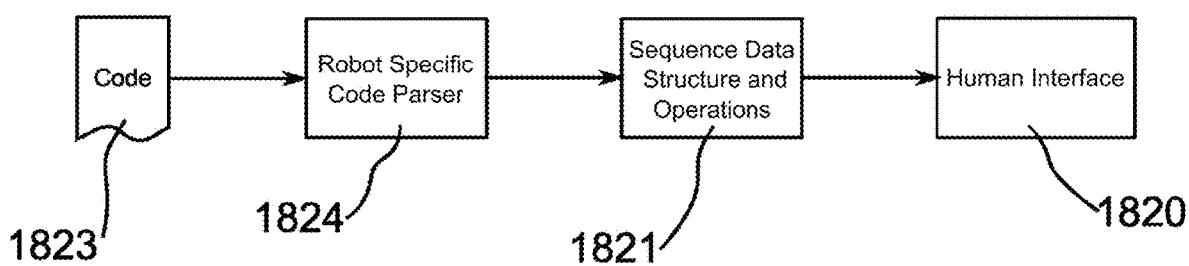
FIG. 21 is a data flow diagram representing the importing of a program code file as a programmed sequence of instructions that may be presented in the graphical user interface, according to one embodiment.

According to an alternate embodiment and as presented in FIG. 21, when the user selects the import function button, a user selected code file holding manipulator's native code 1823 is parsed by a manipulator specific code parser 1824. The code parser 1824 parses the native code 1823 and from the parsed code a sequence data structure 1821 is instantiated such that the sequence interface 2402 may present to the end user for editing or playing-back the programmed sequence of instructions as imported.

Interfacing with the Manipulator

Figure 22:
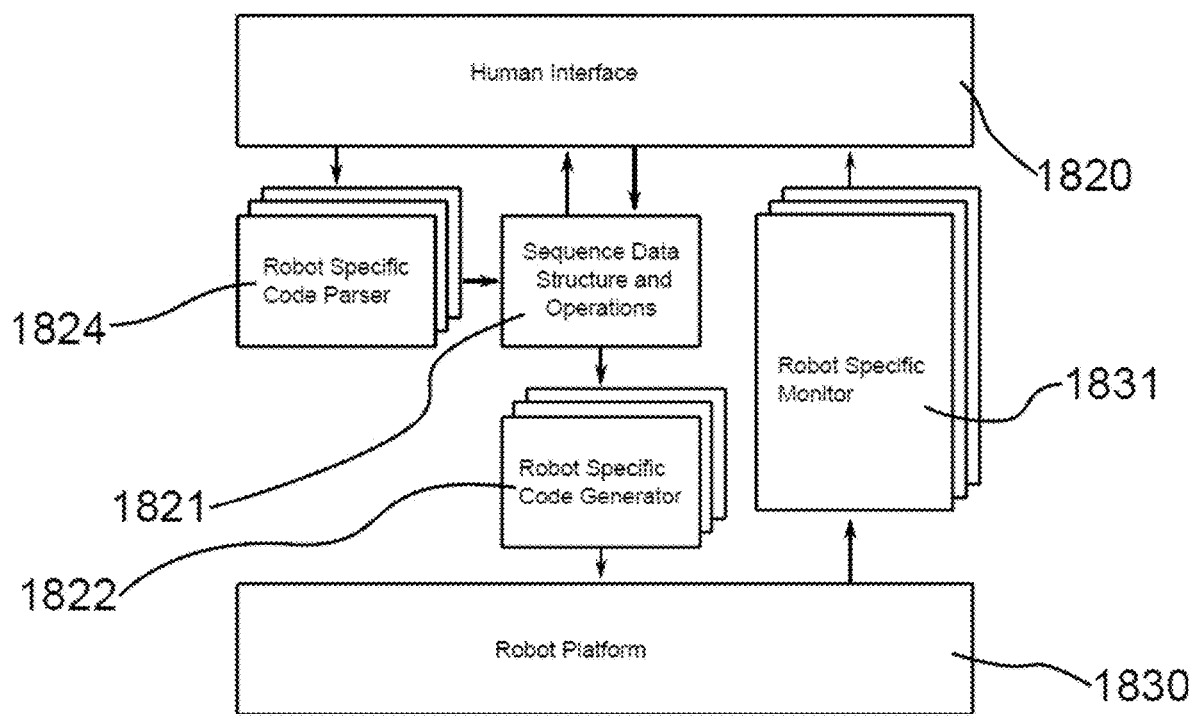
FIG. 22 is a block diagram representing modules for interfacing between the programing device and the manipulator.

Presented in FIG. 22 are the various modules used for interfacing between the programming device 1820 and the manipulator platform 1830. As described above, the user uses the programming device 1820 for defining a sequence of instructions via the operation sequence interface 2402. The defined sequence of instructions is passed onto the manipulator 1830 for the manipulator to perform the sequence of instructions by accordingly moving a tool, launching application specific events and controlling the application specific events. However, for the manipulator to perform the defined sequence of instructions, the sequence of instructions must be converted into manipulator specific code language.

The manipulator specific code language although precise is relatively complex. Moreover, there is no universal manipulator code language that has to date been adopted and the code language for each different manipulator is manufacturer dependent. Therefore, an interface software that connects with the manipulator is also manufacturer dependent. Consequently, it is desirable to have an interface software that is modular and swappable. According to one embodiment, the interface software may be easily changed according to the manipulator manufacturer. This way, the same programming device 1820 may be used with a manipulator of any manufacturer.

According to one embodiment, in order to interface with the manipulator, a manipulator specific code generator 1822 converts the sequence of instructions into manipulator specific code language. As described above for exporting, the sequence of instructions is represented by the sequence data structure 1821 that is used as input for the code generator 1822. The code generator 1822 then converts the sequence into manipulator specific code language.

As described above, for importing a sequence of instructions from an input file of manipulator specific code 1823, the programming device 1820 uses a manipulator specific code parser 1824 for parsing the imported code 1823. A sequence data structure 1821 is instantiated according to the parsed imported code thereby allowing the programming device 1820 to display user recognizable icons representing the sequence of instructions imported for further editing or playing-back.

The action type configuration file 1902 is used by the code generator 1822 to translate custom instructions that are not part of the robot's basic instruction set into the robot's native language. Moreover, the action type configuration file 1902 is also used by the code parser 1824 to identify instructions that are not part of the robot's basic instruction set and to include them in the interface.

Further presented is FIG. 22, is a manipulator specific monitor 1831 that communicates information from the manipulator platform 1830 and to the programming device 1820. Its purpose is to gather information relating to the manipulator platform 1830, such as: a current position of the manipulator, a current instruction being executed, an alarm status, etc. The format of the information gathered is normally universal to manipulator platforms of different manufacturer. However, in many instances the transmission protocol differs from one manipulator platform 1830 to another depending on the manufacturer. Consequently, a manipulator specific monitor 1831 is implemented according to the manufacturer.

Sequence Data Structure

A sequence of instructions is stored as a sequence data structure 1821. According to one embodiment, the sequence data structure 1821 is a tree data structure in which an instruction is represented by a node containing data representing associated parameters. In order to display a list of instructions to the user, the list of instructions is produced by applying a traversal algorithm to the tree data structure. It is known that various traversal or search algorithms may be applied. In this embodiment, a preorder traversal pattern is applied to generate a list of instructions out of the tree data structure and the inherent hierarchy of the tree data structure is used to organize the sequence of instructions. Conveniently, a subsequence of instructions can be added to the tree data structure or be manipulated independently of the rest of the sequence of instructions. For example, if two identical tubes have to be welded on a plate, a sequence of instructions may be programmed for welding a first tube on the plate and the sequence of instructions may be copied and inserted into the tree data structure as a sub-sequence with an offset for welding a second tube on the plate with an offset.

A skilled reader will understand that the sequence data structure 1821 may be defined by any other suitable means of representing such structure (i.e. an array, a linked list, etc.).

Manipulator Specific Code Generator

The manipulator specific code generator 1822 is adapted to receive the sequence data structure and translate it into a program code that a manipulator controller can understand, as presented in FIG. 22. This module 1822 uses the sequence data structure representation and converts it into a more complex program code representation by undoing the abstraction of the programming language. According to one embodiment, the algorithm used for performing the conversion allows to visit every node of the tree depth-first in a preorder pattern. Thus, every instruction of the sequence is treated in the same order as appeared in the manipulator's native code language.

Parser

The parser 1824 provides for abstracting the manipulator's complex programming language, as presented in FIG. 22. The parser 1824 translates a manipulator program code into a sequence of instructions that the programming device will be able to display in the sequence interface 2402. According to one embodiment, the parser 1824 applies an algorithm for reading the program code line by line. For each parsed instruction, the associated parameters are parsed and an associated node—to which are added the associated parameters—is created in the tree data structure.

Monitor

The Monitor 1831 receives the manipulator's state information and generates a manipulator current state information for the programming device, as presented in FIG. 22. The manipulator current state information being indicative of the manipulator's current position and/or instruction being executed. Such information may provide information to the user whether or not the manipulator has reached an instructed target.

Workflow

Figure 23A:
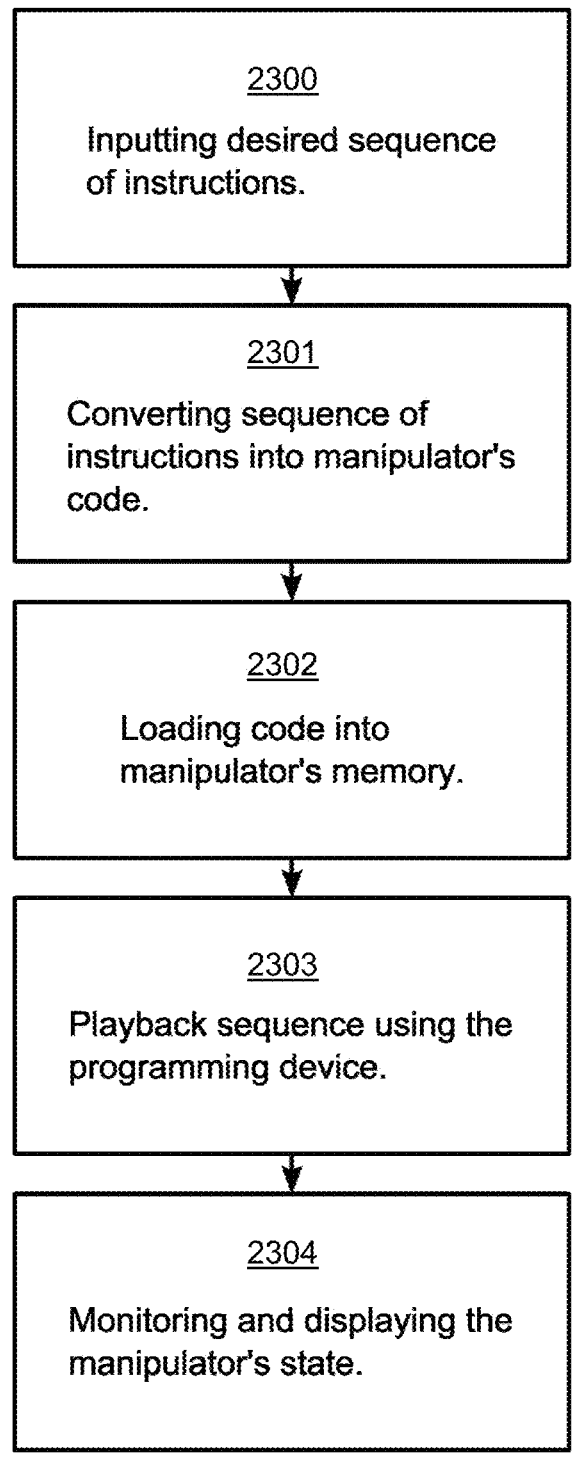
FIG. 23A is a workflow diagram representing a method of programming a set of instructions from a user input with the programming device, according to one embodiment.

According to one embodiment, the following workflow may be executed, as presented in FIG. 23A:
1. The user inputs a desired set of instructions with the programming device for building a sequence of instructions 2300.
2. For testing/executing/playing-back the sequence of instructions, the generator converts the sequence of instructions into the manipulator's code language 2301.
3. The generated code is loaded into the manipulator's memory 2302.
4. The user starts the manipulator playback with the programming device, either step by step or all at once 2303.
5. The monitor receives the manipulator's state and the manipulator's state is displayed on the sequence interface of the programming device 2304.

Figure 23B:
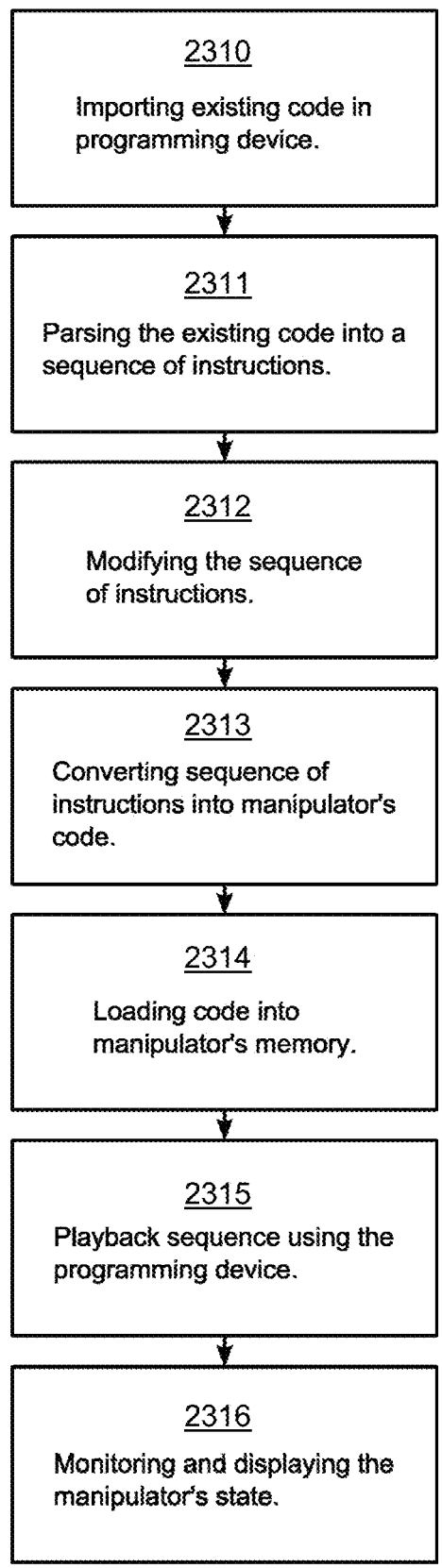
FIG. 23B is a workflow diagram representing a method of programming a set of instructions from an imported code file with the programming device, according to one embodiment.

According to an alternate embodiment, the following workflow may be executed, as presented in FIG. 23B:
1. The user imports an existing code file into the programming device for building a sequence of instructions 2310.
2. The code is parsed by the parser and converted into a simple sequence of instructions 2311.
3. The sequence of instructions and parameters is modified by the user 2312.
4. For testing/executing/playing-back the sequence of instructions, the generator converts the sequence of instructions into the manipulator's code language 2313.
5. The generated code is loaded into the manipulator's memory 2314.
6. The user starts the manipulator playback with the programming device, either step by step or all at once 2315.
7. The monitor receives the manipulator's state and the manipulator's state is displayed on the sequence interface of the programming device 2316.

Figure 23C:
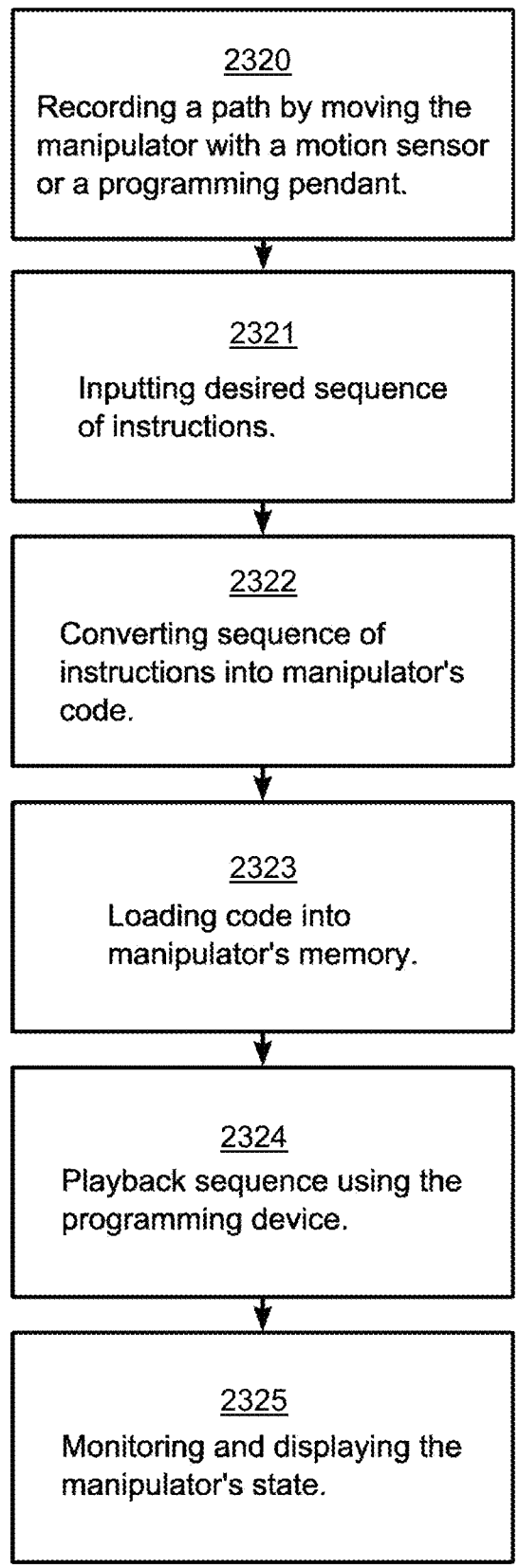
FIG. 23C is a workflow diagram representing a method of programming a set of instructions from a recorded path and a user input with the programming device, according to one embodiment.

According to another alternate embodiment, the following workflow may be executed, as presented in FIG. 23C:
1. The user records by teaching the manipulator a desired path with a teach pendant or a motion sensor 2320.
2. The user inputs a desired set of instructions with the programming device for building a sequence of instructions with the taught motion 2321.
3. For testing/executing/playing-back the sequence of instructions, the generator converts the sequence of instructions into the manipulator's code language 2322.
4. The generated code is loaded into the manipulator's memory 2323.
5. The user starts the manipulator playback with the programming device, either step by step or all at once 2324.
6. The monitor receives the manipulator's state and the manipulator's state is displayed on the sequence interface of the programming device 2325.

What is claimed is:

1. A method of training a robotic manipulator system, the method comprising:
providing a force/torque sensor at or near an end effector of the robotic manipulator system; and
applying forces to said sensor and using signals from said sensor to pilot the end effector into one or more engagement positions during a training or learn mode to define motion of the robotic manipulator system during task operation,
wherein said sensor is mounted between said end effector and said robotic manipulator system, said forces being applied to said end effector, compensating for the weight of said manipulator system and/or said force/torque sensor by removing pre-calibrated or measured weight information from the force/torque measurements and orientation of the robotic manipulator system, and said forces being determined using correction of signals from said force/torque sensor using said weight.

2. The method as claimed in claim 1, wherein signals of said sensor when no forces are applied to said end effector are subtracted from signals of said sensor while forces are applied.

3. The method as claimed in claim 1, wherein said manipulator is kinematically redundant for a desired process, said providing a force/torque sensor at or near an end effector of the robotic manipulator system further comprises providing a force/torque sensor at one or more additional locations along a kinematic chain of said manipulator, said forces being applied to said end effector and to said additional locations so that a desired configuration can be fully controlled by a user.

4. The method as claimed in claim 1, wherein said sensor is mounted to said robotic manipulator system near said end effector and a handle is connected to said sensor for measuring forces between said handle and said robotic manipulator system.

5. The method as claimed in claim 1, wherein said end effector is a welding tool.

6. The method as claimed in claim 1, wherein said end effector is a gripper.

7. The method as claimed in claim 1, further comprising using a training pendant to control said manipulator and/or said end effector, and/or to record positions of said manipulator.

8. A method of manufacturing a product using a robotic manipulator system, the method comprising:
   training said robotic manipulator system as claimed in claim 1; and
   using said trained robotic manipulator system to manufacture said product.

9. The method as claimed in claim 8, wherein said force/torque sensor is used to measure contact between said end effector and an object in a workspace to control a motion of said manipulator system.

10. The method as claimed in claim 8, wherein said training said robotic manipulator system further comprises inputting a selected action type and an associated parameter with a programming device by selecting said action type from a list of action types presented by said programming device to define said motion of the robotic manipulator system according to the applied force to said sensor.

11. The method as claimed in claim 10, wherein said list of action types comprises action types that are individually represented by an icon.

12. The method as claimed in claim 10, wherein said list of action types are presented in a user interface of the programming device and said list of action types is a restricted list of action types according to a current instruction or a current position of said manipulator and/or said end effector and/or according to a type of said end effector.

* * * * *